United States Patent [19]
Barwacz et al.

[11] Patent Number: 5,986,718
[45] Date of Patent: Nov. 16, 1999

[54] PHOTOGRAPHIC METHOD USING CHROMA-KEY AND A PHOTOBOOTH EMPLOYING THE SAME

[75] Inventors: David M. Barwacz; Jason J. Jensen, both of Grand Rapids, Mich.

[73] Assignee: Video Magic, Inc., Grand Rapids, Mich.

[21] Appl. No.: 08/715,075

[22] Filed: Sep. 19, 1996

[51] Int. Cl.⁶ .............................. H04N 9/73; H04N 9/75
[52] U.S. Cl. ........................ 348/592; 348/586; 348/587; 345/113; 345/114
[58] Field of Search .................................. 348/592, 586, 348/587, 584, 590, 591, 598, 599; 345/113, 114; H04N 9/73, 9/75

[56] References Cited

U.S. PATENT DOCUMENTS

| | | |
|---|---|---|
| 3,398,664 | 8/1968 | Bonatsos . |
| 3,864,708 | 2/1975 | Allen . |
| 4,037,249 | 7/1977 | Pugsley . |
| 4,052,739 | 10/1977 | Wada et al. . |
| 4,122,490 | 10/1978 | Lish ......................................... 348/592 |
| 4,130,834 | 12/1978 | Mender et al. . |
| 4,319,266 | 3/1982 | Bannister ................................ 348/592 |
| 4,393,394 | 7/1983 | McCoy .................................... 348/587 |
| 4,467,349 | 8/1984 | Maloomian ............................. 348/586 |
| 4,486,774 | 12/1984 | Maloomian ............................. 348/586 |
| 4,539,585 | 9/1985 | Spackova et al. . |
| 4,561,061 | 12/1985 | Sakamoto et al. . |
| 4,602,280 | 7/1986 | Maloomian . |
| 4,687,526 | 8/1987 | Wilfert . |
| 4,688,105 | 8/1987 | Bloch et al. . |
| 4,731,743 | 3/1988 | Blancato ................................. 348/586 |

(List continued on next page.)

FOREIGN PATENT DOCUMENTS

| | | |
|---|---|---|
| 0084064 | 7/1983 | European Pat. Off. . |
| 0235398 | 9/1987 | European Pat. Off. . |
| 0326515 | 8/1989 | European Pat. Off. . |
| 3422285 | 1/1985 | Germany . |
| 1206098 | of 1989 | Japan . |
| 2078411 | 1/1982 | United Kingdom . |

*Primary Examiner*—John K. Peng
*Assistant Examiner*—Jean W. Désir
*Attorney, Agent, or Firm*—Price, Heneveld, Cooper, DeWitt & Litton

[57] ABSTRACT

An image processing method and photobooth employing the method are disclosed which produce a composite image using a conventional chroma-key device. The subject in the photobooth is illuminated with low temperature light and is filmed before a backdrop of uniform saturated blue color to provide a foreground image to the chroma-key device. The chroma-key device compares the intensity of the blue color component for each pixel of the foreground image to a threshold intensity level and replaces those pixels of the foreground image that have a blue color component intensity greater than the threshold with a corresponding pixel of a pre-stored background image thereby producing a composite image. By illuminating the subject with low temperature light, the method decreases the intensity of most blue color components in the light reflected from the subject to a level below the threshold level used by the chroma-key device. The output color of the chroma-key device is preferably adjusted to correct for the color-shifting of the subject caused by the illumination with low temperature light. Further, the blue backdrop may be illuminated with a high temperature light to further saturate the blue color and enable the threshold intensity level of the chroma-key device to be increased thereby increasing the likelihood that the chroma-key device will be able to distinguish between the subject and the backdrop in the foreground image. Also disclosed is a photobooth having a separate processor for resetting the photobooth controller in the event it becomes hung-up. Additionally, a photobooth operating system is disclosed that enables an operator to readily add, delete, enable, disable, and update program routines for various user selectable picture-type options in the field without having to replace the photobooth.

64 Claims, 14 Drawing Sheets

U.S. PATENT DOCUMENTS

| | | |
|---|---|---|
| 4,786,944 | 11/1988 | Sakamoto et al. . |
| 4,796,180 | 1/1989 | Riley . |
| 4,805,037 | 2/1989 | Noble et al. . |
| 4,811,084 | 3/1989 | Belmares-Sarabia et al. ......... 348/592 |
| 4,823,285 | 4/1989 | Blancato . |
| 4,827,253 | 5/1989 | Maltz ..................................... 348/587 |
| 4,841,378 | 6/1989 | Cogert . |
| 4,864,410 | 9/1989 | Andrews et al. . |
| 4,872,056 | 10/1989 | Hicks et al. . |
| 4,891,660 | 1/1990 | Biondo, Jr. . |
| 4,910,661 | 3/1990 | Barth et al. . |
| 4,959,670 | 9/1990 | Thayer, Jr. . |
| 4,965,673 | 10/1990 | Bozzo et al. . |
| 5,117,283 | 5/1992 | Kroos et al. ............................ 348/586 |
| 5,343,386 | 8/1994 | Barber . |
| 5,345,313 | 9/1994 | Blank . |
| 5,398,075 | 3/1995 | Freytag et al. .......................... 348/592 |
| 5,400,081 | 3/1995 | Chaplin ................................... 348/592 |
| 5,459,529 | 10/1995 | Searby et al. ............................ 348/586 |
| 5,469,536 | 11/1995 | Blank . |
| 5,528,309 | 6/1996 | Nguyen ................................... 348/592 |
| 5,630,037 | 5/1997 | Schindler ................................ 348/592 |
| 5,646,679 | 7/1997 | Yano et al. ............................... 348/586 |
| 5,657,095 | 8/1997 | Yoshida et al. ......................... 348/584 |

PHOTOGRAPHIC METHOD USING CHROMA-KEY AND A PHOTOBOOTH EMPLOYING THE SAME

BACKGROUND OF THE INVENTION

The present invention relates to methods and systems for image processing and, more particularly, to a method and system for producing a composite image by combining a foreground image with a background image. Further, the present invention generally relates to a photobooth system and, more particularly, to a software operating system for a photobooth.

One of the most common methods of forming a composite image of a subject in the foreground of a pre-stored background image is the technique known as "chroma-key." As illustrated in FIGS. 1A–1C, the chroma-key technique typically involves the filming of a first image 24 (FIG. 1A) of the foreground subject 22 in front of a blue backdrop 25 and the subsequent image processing and superimposing of a pre-stored second image 27 (FIG. 1B) of a background 26 over all portions of the first image 24 having the particular color characteristics of the blue backdrop 25 to form a composite third image 28 (FIG. 1C) in which subject 22 appears in front of background 26. The chroma-key technique is currently widely employed in the movie industry, as well as in providing a television broadcast of a weatherman in front of satellite images and other weather maps.

Image processing systems used for chroma-key typically include a video camera or another form of image capturing device that optically filters the received optical image (24) using three different color filters. These three color filters are typically red, green, and blue, and are positioned between an imaging lens and a number of (usually 1 to 3) CCD sensor(s), or the like, such that red, green, and blue (RGB) analog video signals are generated. The RGB video signals represent the intensity of the RGB primary color components of the image 24. Conventional chroma-key devices receive these RGB video signals and compare the intensity of the blue, green, or red component or, in some cases, the relative intensity (or any other color corresponding to the backdrop 25) for each pixel (or point along an analog scan line) of the image 24 to a threshold intensity level (some devices look at the intensity or relative intensity and determine if it is in a range (i.e., between a minimum and maximum)). In most cases the RGB signal is converted to a different color space such as YUV or Y Cr Cb and comparisons are made with one or more of the components to determine the action of the chroma-key device. If the backdrop is saturated blue and the blue component intensity level of a pixel meets the criteria (range or threshold), the chroma-key device replaces that pixel with a pixel from a pre-stored background image 27 (i.e., such as a weather map). Some chroma-key devices mix the pixels of the foreground and background, the resultant pixel color components become a mathematical average (according to a predetermined algorithm) of the individual color components of the foreground pixel and the background pixel. The amount of each pixel's contribution to the resultant pixel is determined by the proximity of the intensity of one color component to a threshold intensity or range of intensities. The mixing method can be useful in some environments and the pixel replacement useful in others. It should be noted that there may be many different types of chroma-key devices available presently or to be developed in the future. For the purposes of this discussion, the term "pixel replacement" shall include mixing where the unwanted pixel is an unobjectable percentage of the resultant pixel. Thus, by utilizing a backdrop 25 that is a saturated blue color and illuminating it with light such that the reflected intensity as seen by the image capturing device is in the proper range such as that shown in FIG. 2A, the foreground subject 22 can be distinguished from the backdrop 25 in the RGB video signals so long as the foreground subject 22 is not wearing clothing that has a blue color component with a reflected intensity meeting the conditions for pixel replacement.

Chroma-key has been widely accepted in the movie and television environments primarily because of the ability to control the colors in the foreground subject's clothing or by controlling the overall colors in the foreground subject 22 itself so as to include color components such as those shown in FIG. 2B while not including the same blue color components as provided in the blue backdrop 25 (i.e., not having a blue component resulting in pixel replacement). However, in some environments such as a photobooth, one may not have any control over the colors of the foreground subject 22. For example, if a photobooth was equipped with chroma-key and someone off-the-street having blue clothing that produces the RGB components shown in FIG. 2C were to have a picture taken, the person 22 would appear transparent since the chroma-key device would superimpose the background image 27 over the person's clothing. Thus, chroma-key has been considered unsuitable for use in a photobooth. The unsuitability of chroma-key in such photobooth applications has been explicitly recognized in U.S. Pat. No. 5,345,313 issued to Blank and U.S. Pat. No. 5,469,536 issued to Blank.

Because of the demand in the market for a photobooth that is capable of superimposing the image 24 of a person(s) entering the photobooth over a background image 27, which may be an image of a famous tourist attraction, there exists the need for a method for providing an acceptable composite image 28 regardless of the colors of the foreground subject 22 entering the booth.

In an attempt to avoid the problems associated with utilizing a chroma-key technique in a photobooth, a technique is disclosed in U.S. Pat. No. 5,469,536 issued to Blank, which utilizes interactive digital editing techniques. This technique relies on digitally determining the edges of the subject image and assumes that the portion of the image lying between two consecutive edges is all subject (i.e., not to be subject to pixel replacement). This method, however, suffers from the difficulty in determining the edges of a subject if the edges or a portion of the edges are blue (or near in color to the background).

Presently, conventional photobooths are capable of performing only a few different types of image processing techniques such as providing a basic photograph or performing a processing technique known as "morphing" whereby images of two people are obtained and image processing is performed to provide an image of what a child of these two people might look like. Alternatively, an image of a single person may be obtained by the camera and subsequently "morphed" with the pre-stored image of a celebrity. To implement this morphing technique, which has only recently become high in demand, manufacturers of photobooths are having to totally replace their photobooths with new ones that specifically have this capability. However, if the demand for this morphing technique proves to just be a fad, and some new processing technique should subsequently become high in demand, photobooth manufacturers would again have to replace their photobooths with new photobooths to meet the demand for the new picture type. Because of the quickly changing trends in the art of the design and development of photobooths, there exists the need for a photobooth having a photobooth operating system and a versatile input mechanism that allows new functionalities to be implemented in the photobooth merely by writing a computer program within the parameters established by the photobooth operating system and adding the program to the system in a modular fashion.

Because photobooths are often installed in various widespread locations and are maintained by a single entity, there exists the need for a photobooth that is low in maintenance and rarely gets hung-up (caused by software lockups, power surges, etc.). Further, there exists the need for a photobooth that allows for the operator to perform diagnostic operations remotely over a telephone line or the like.

SUMMARY OF THE INVENTION

The present invention solves the above-noted problems by providing an image processing and filming technique that enables effective chroma-key techniques to be implemented in the environment of a photobooth without requiring the subject entering the booth to wear clothing of any particular color. It is another aspect of the present invention to provide a photobooth that allows the picture image of a subject to be superimposed upon a selected one of a plurality of background images to print out a composite image.

To achieve these aspects and other features and advantages, the method of producing a photograph of a subject according to the present invention, comprises the steps of: (1) providing a backdrop behind the subject, the backdrop having a uniform saturated color which, when illuminated, reflects primarily only the saturated color, (2) illuminating the subject with light having a spectral distribution that causes a shifting of the perceived colors of the subject by decreasing the intensity of any color components reflected from the subject that correspond to the saturated color of the backdrop, (3) filming the subject and the backdrop using a camera capable of generating electric signals representing a foreground image of the subject and the backdrop, and (4) superimposing a previously-stored background image over those portions of the foreground image having color components corresponding to that of the backdrop that meet predetermined criteria to produce a composite image. Such predetermined criteria is selected so as to enable the color characteristics of the backdrop to be made more readily distinguishable form the color characteristics of the subject. Such criteria may include a threshold intensity level or a range of intensity levels that are established to correspond to the saturated color of the backdrop.

The photobooth of the present invention, which is constructed to achieve the above features and advantages, comprises a memory for storing at least one background image, and a backdrop of uniform color disposed on a rear wall of the photobooth behind a location where at least one subject is to be photographed. The backdrop having a saturated color which, when illuminated, reflects primarily only the saturated color. The photobooth further includes a light source for illuminating the subject with light having a spectral distribution that causes a shifting of the perceived colors of the subject by decreasing the intensity of any color components reflected from the subject that correspond to the saturated color of the backdrop, and a camera for generating image signals representing a foreground image of the subject and the backdrop. Additionally, the photobooth further includes an image processing device, such as a chroma-key device, coupled to the camera for receiving the image signals, and coupled to the memory for receiving a background image. The image processing device superimposes corresponding portions of the background image on corresponding portions of the foreground image that have color components corresponding to that of the backdrop that meet the predetermined criteria, to produce a composite image signal. The photobooth additionally includes a printer for receiving and printing the composite image.

Preferably, the color of the backdrop is a saturated blue, the light source is a low color temperature light source, and the chroma-key device replaces or mixes so as to substantially replace each pixel of the foreground image that has a blue primary color component that is in a range of color components that cause the chroma-key device to take the action of superimposing with a corresponding pixel of the background image. The photobooth further preferably includes a color adjustment circuit coupled to the chroma-key device for receiving the composite image and for adjusting the color of the composite image to compensate for color shifting that results from illuminating the subject with light from the light source.

The photobooth of the present invention may also include a second light source positioned in the photobooth between the subject and the backdrop to illuminate the backdrop with light that creates further separation of the color components reflected from the subject and the backdrop. If the backdrop is blue, the second light is preferably a high color temperature light source. This increases the intensity of the blue component reflected by the backdrop and allows the chroma-key device to be set for a range that is less likely to be reflected from the subject.

In addition, the photobooth of the present invention may include a user input device for generating a take-picture signal in response to an actuation thereof, and a controller coupled to the printer and to the user input device for controlling the printer to print the composite image in response to the take-picture signal received from the user input device. Further, the photobooth may include a display monitor coupled to the controller for displaying information to the user. The user input device may be a touch screen input device provided on the display monitor, and the controller may display user options to the user on the display monitor and respond to the selection of a user option as provided through the touch screen input device by implementing the selected user option.

A plurality of different background images may be stored in the memory and the controller is preferably coupled to the memory for reading the background images therefrom and for displaying the background images on the display monitor for a user to select one of the displayed background images by actuating the touch screen input device in a region of the display monitor corresponding to the region in which the selected background image is displayed. The controller is coupled to the chroma-key device for supplying the chroma-key device with the selected background image. The display monitor may receive and display the composite image produced by the chroma-key device.

Additionally, the photobooth of the present invention may include a modem coupled to the controller and adapted for coupling to an external communication link for enabling remote access and communication with the controller. The controller may receive background images from a remote location through the modem and may store the received background images in the memory for selection by users of the photobooth.

Another aspect of the present invention is to provide a photobooth in which malfunctions of the photobooth controller are detected and in which measures are automatically taken to minimize the effect of such malfunctions. It is a further aspect of the present invention to provide a mechanism for resetting the controller of a photobooth when it becomes hung-up. To achieve this aspect and other advantages, the photobooth of the present invention comprises user input means for generating a take-picture signal in response to an actuation thereof, a camera for generating an image of a subject, a printer for printing the image of the subject, a controller coupled to the printer and to the user input device for controlling the printer to print the image in response to the take-picture signal received from the user input means, and a processor coupled to the controller for monitoring signals generated by the controller to determine whether the controller is malfunctioning. When the processor determines that the controller is malfunctioning, the processor resets the controller. Preferably, the controller periodically supplies reset signals to the processor when operating properly, and the processor includes a timer that measures a period of time since the last reset signal was received from the controller. In this manner, the processor resets the controller when the measured period of time exceeds a predetermined threshold.

Another aspect of the present invention is to provide an operating system for a photobooth that allows new functions and features to be readily installed in an existing photobooth by a field operator or by modem. Still another aspect of the present invention is to provide a photobooth operating system that allows different types of hardware components to be added, removed, or changed easily. Yet another aspect of the present invention is to provide a photobooth operating system that allows new user selectable picture-type options to be readily added, deleted, updated, enabled, and/or disabled without requiring the photobooth to be physically altered. A further aspect of the present invention is to provide a photobooth operating system that defines parameters whereby any third party may write program routines for a new picture-type option that may be performed by the photobooth using its existing hardware. Yet another aspect of the present invention is to provide a photobooth operating system that allows new images to be easily downloaded to the system's memory for subsequent presentation to, and selection by, a user desiring a picture type that requires a pre-stored image.

To achieve these and other aspects and advantages, the present invention provides a computer-executable operating system for a controller of a photobooth having image processing equipment coupled to the controller for generating and processing an image of at least one subject inside the photobooth, the photobooth further including a service switch, a memory device, a display monitor, a user input device for receiving user input selections, and a data input device, all coupled to the controller. The operating system comprises service switch detection means for detecting an actuation of the service switch, mode changing means for changing a mode of controller operation between an operating mode and a service mode in response to an actuation of the service switch, operating means operable during an operating mode for instructing the controller to (1) display a user option screen showing user selectable options on the display monitor including picture-type options that relate to a type of picture that is desired by the user, (2) receive user input from the user input device and identify which of the displayed options the user has selected, and (3) execute one of a plurality of program routines stored in the memory device corresponding to a picture type selected by the user, wherein the program routines cause the controller to control the image processing equipment in a manner required to produce the selected picture type, and wherein the program routines return execution control of the controller to the operating system. The operating system may further include service means operable during a service mode for instructing the controller to (1) display operator selectable options on the display device including an option for adding a new picture-type option, (2) read a new program routine corresponding to the new picture-type option from the data input device in response to an operator selection of the option for adding a new picture-type option, (3) store the new program routine in the memory device, and (4) reconfigure an operator option screen to include the new picture type as a picture-type option that may be enabled. Alternatively, or in addition, the service means may instruct the controller to (1) display operator selectable options on the display device including an option for enabling a new user selectable picture-type option to the user option screen, (2) display any user selectable picture types stored in the memory device that are disabled in response to an operator selection of the option for enabling a new picture-type option, to enable the operator to select the picture-type option to be enabled, (3) reconfigure the user option screen to include the operator-selected new picture type as a user selectable option, and (4) create a program call to the program routine stored in the memory device that corresponds to the new picture-type option to be added to the user option screen, the newly created program call causes the controller to execute the corresponding program routine in response to a user selection of the new picture type when the controller is in the operating mode.

Alternatively, or in addition, the service means may instruct the controller to (1) display operator selectable options on the display device including an option for removing one of the existing user selectable picture-type options, (2) display the picture-type options on the display device in response to an operator selection of the option for removing a picture-type option to enable the operator to select the picture-type option to be removed, (3) delete from the memory device, the program routine corresponding to the picture-type option selected by the operator for deletion, (4) reconfigure the user option screen to remove any reference to the picture-type option to be removed as a user selectable option, and (5) delete any program calls to the deleted program routine that would attempt to cause the controller to execute the deleted program routine when the controller is in the operating mode. Alternatively, or in addition, the service means may instruct the controller to (1) display operator selectable options on the display device including an option for disabling one of the existing user selectable picture-type options, (2) display the picture-type options on the display device that are currently enabled in response to an operator selection of the option for removing a picture-type option, to allow the operator to select the picture-type option to be disabled, (3) reconfigure the user option screen to remove any reference to the picture-type option to be disabled as a user selectable option, and (4) delete any program calls to the program routine stored in the memory device that corresponds to the disabled picture-type option and that would cause the controller to execute the program routine when the controller is in the operating mode.

According to another embodiment of the present invention, the operating system of the present invention may alternatively or additionally comprise service switch detection means for detecting an actuation of the service switch, mode changing means for changing a mode of controller operation between an operating mode and a service mode in response to an actuation of the service switch, means operable during an operating mode for instructing the controller to (1) display a user option screen showing user selectable options on the display monitor including a plurality of images that are stored in the memory device and that may be selected by the user for use by the image processing equipment, (2) receive user input from the user input device and identify which of the displayed images the user has selected, and (3) supply the selected image to the image processing equipment. Further, the operating system includes means operable during a service mode for instructing the controller to (1) display operator selectable options on the display device including an option for adding a new user selectable image, (2) read an image file corresponding to the new user selectable image from the data input device in response to an operator selection of the option for adding a new image, (3) store the image file in the memory device, (4) reconfigure the user option screen to include the new image as a user selectable option, and (5) create a program call to the new image file stored in the memory device that will cause the controller to supply the new image to the image processing equipment in response to a user selection of the new image when the controller is in the operating mode.

These and other features, advantages and objects of the present invention will be further understood and appreciated by those skilled in the art by reference to the following specification, claims and appended drawings.

DETAILED DESCRIPTION OF PREFERRED EMBODIMENT

Figure 1A:
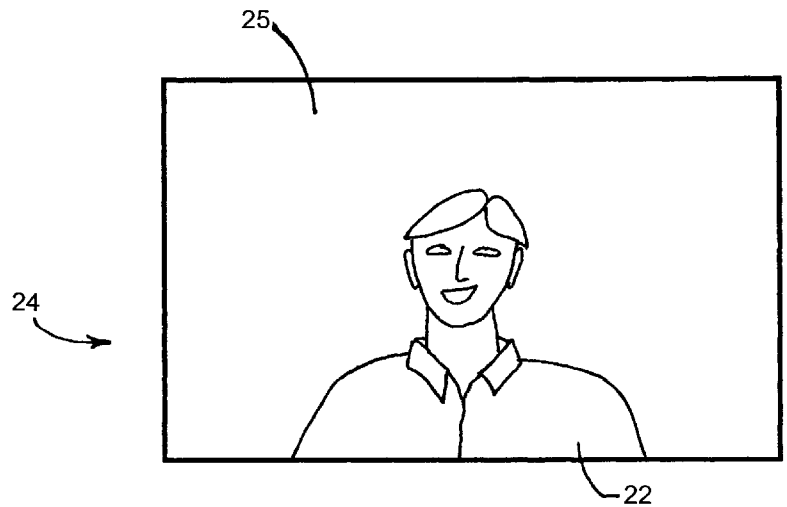
FIG. 1A is a pictorial representation of an image of a foreground subject obtained by a camera.
Figure 1B:
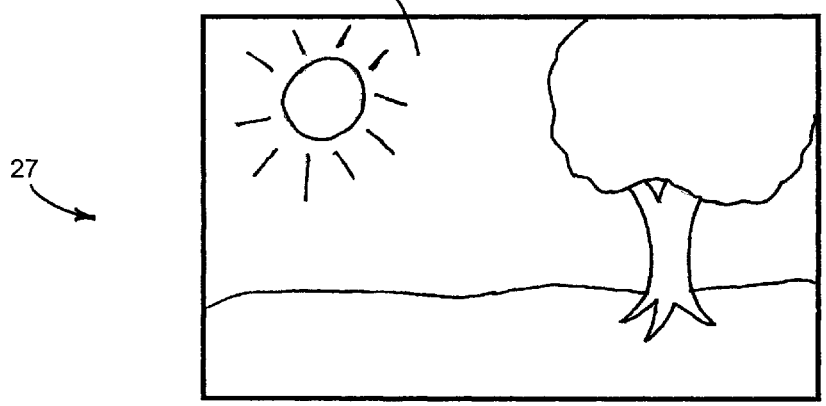
FIG. 1B is a pictorial representation of a background image that may be pre-stored in a memory device.
Figure 1C:
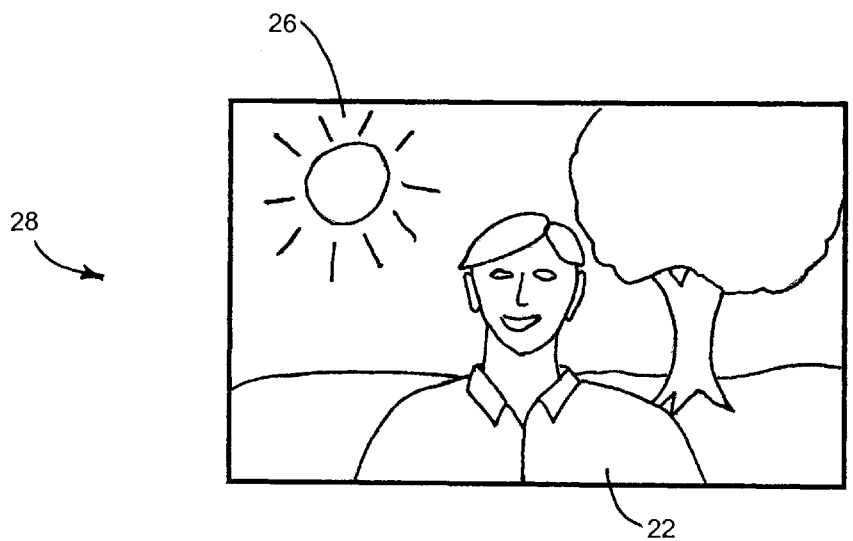
FIG. 1C is a pictorial representation of a composite image that may be produced using a chroma-key device.
Figure 2A:
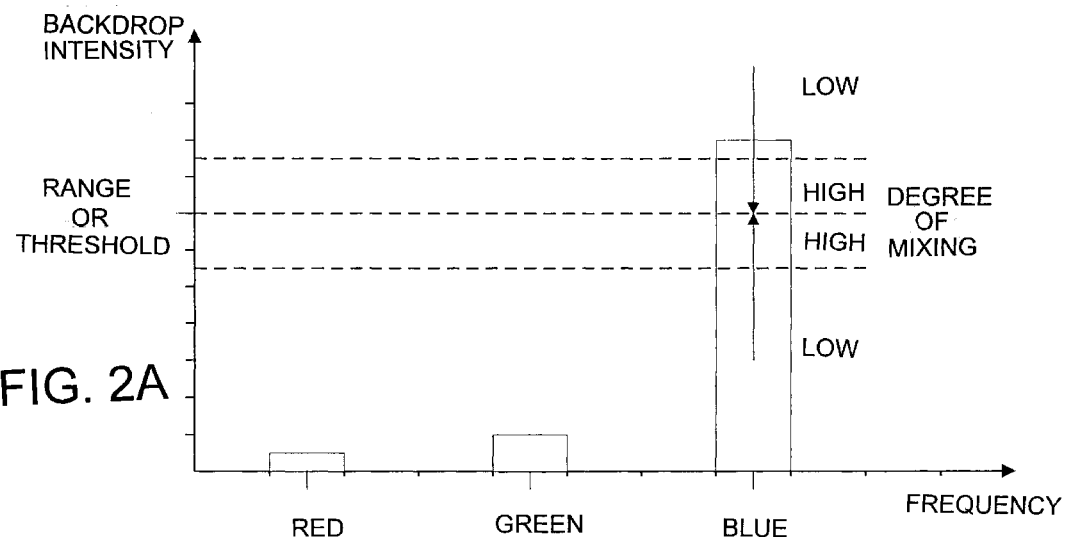
FIG. 2A is a bar graph illustrating the intensities of the RGB color components of a typical pixel of a backdrop used in chroma-key.
Figure 2B:
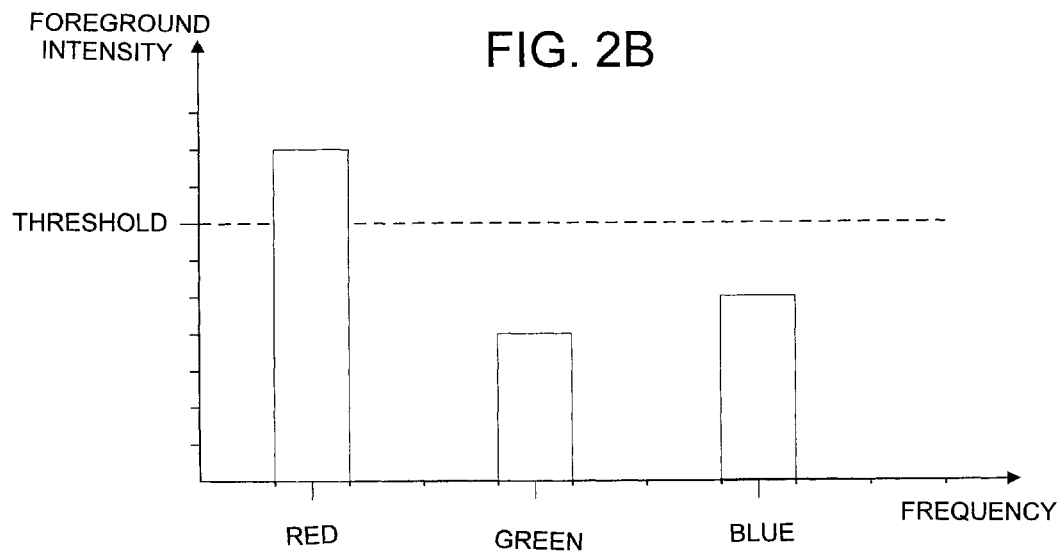
FIG. 2B is a bar graph illustrating the intensities of the RGB color components of a pixel of an exemplary foreground subject.
Figure 2C:
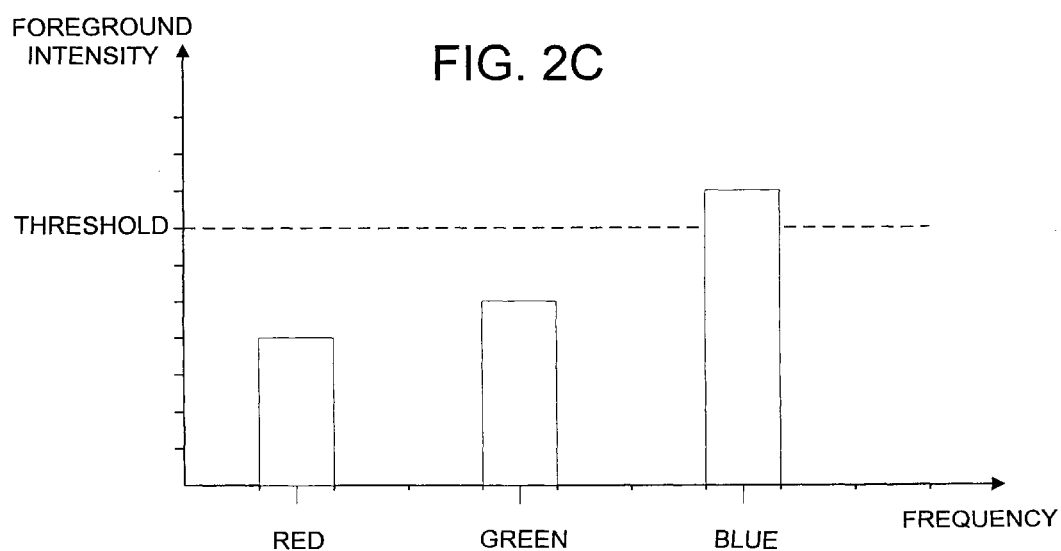
FIG. 2C is a bar graph illustrating the intensities of the RGB color components of a pixel of another exemplary foreground subject.
Figure 3:
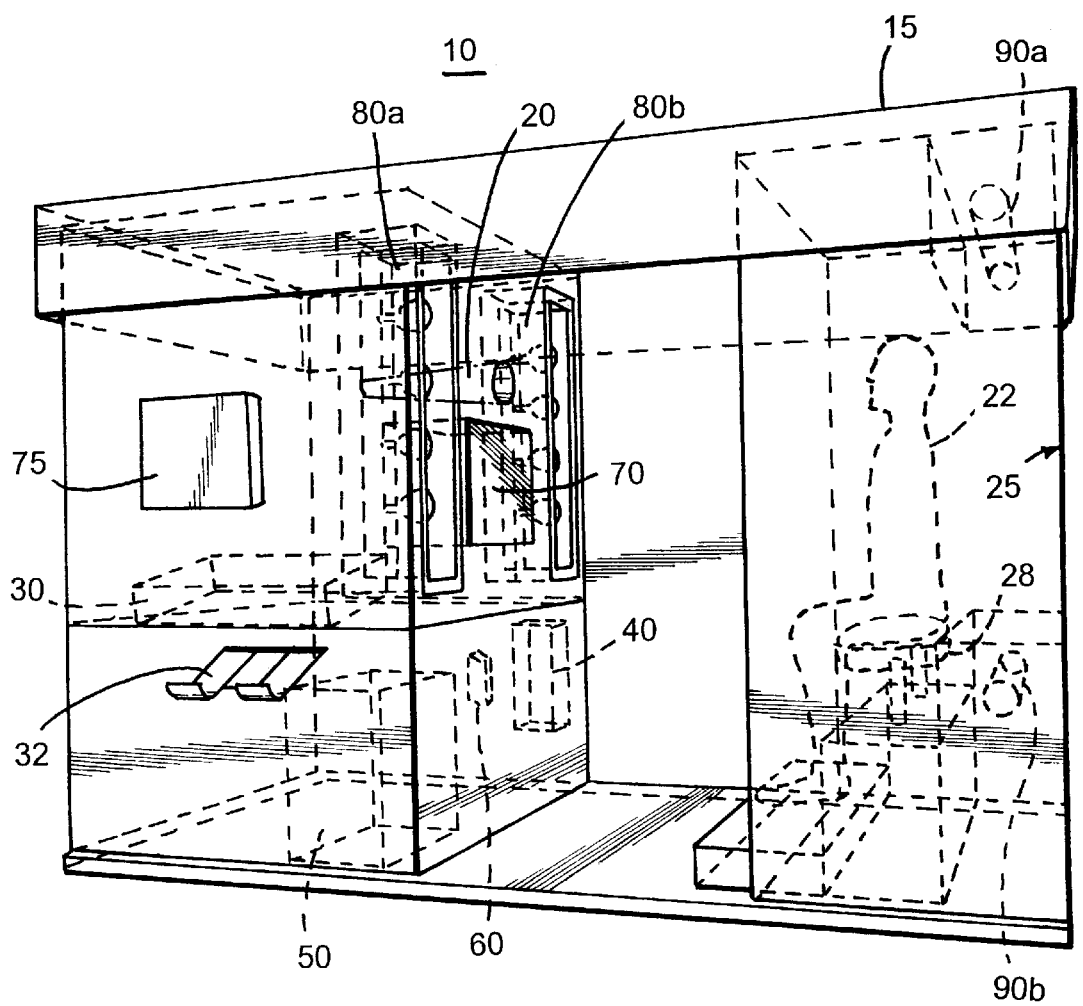
FIG. 3 is an isometric view of a photobooth constructed in accordance with the present invention.

A photobooth constructed in accordance with the present invention is shown in FIG. 3 and designated generally by the reference numeral 10. Photobooth 10 includes an exterior housing 15 in which is mounted a video camera 20 for taking a video image of a subject 22 seated on an adjustable seat 28 before a uniformly-colored backdrop 25. Preferably, backdrop 25 has a uniform and saturated color that includes one primary RGB color component having a saturated color that is typically not found in most clothing fabrics. Video camera 20 may be any conventional three-chip RGB analog camera. Photobooth 10 further includes a printer 30 mounted internally within exterior housing 15 and having a paper output tray 32 that extends outwardly from exterior housing 15 to enable a user to retrieve a printed photograph. Photobooth 10 also includes a bill acceptor 40 for receiving money from the user. Bill acceptor 40 may be of any conventional form without departing from the spirit and scope of the present invention. A computer housing 50 is positioned within exterior housing 15 for housing most of the image processing circuit components that are described in greater detail below with respect to FIG. 5. A logic board housing 60 may be provided and mounted within exterior housing 15 separately from computer housing 50 for housing a logic board and other components of the image processing system.

To enable the user to preview the image obtained by camera 20, and to display various selectable features, a monitor 70 is mounted to exterior housing 15 in proximity to the video camera lens on the inside of the photobooth. Preferably, inside monitor 70 is a computer monitor having the resolution of at least a VGA computer monitor. Further, inside monitor 70 is implemented with a touch screen input device to allow the user to input commands and make selections simply by touching the display screen of inside monitor 70. By providing monitor 70 in proximity to video camera 20, subject 22 may preview the image obtained by video camera 20 and make appropriate positional adjustments to adjustable seat 28 to ensure that subject 22 is in a desired position for the taking of the picture.

An optional output monitor 75 may be mounted to the exterior or within exterior housing 15 to display various introduction graphics as well as a live video image of a subject inside of photobooth 10. Preferably, outside monitor 75 is a television monitor, although a computer monitor could also be utilized. It will be appreciated by those skilled in the art that the positioning of the various elements within the exterior housing 15 of photobooth 10 may be changed significantly from that shown in FIG. 3 without departing from the present invention.

Figure 6:
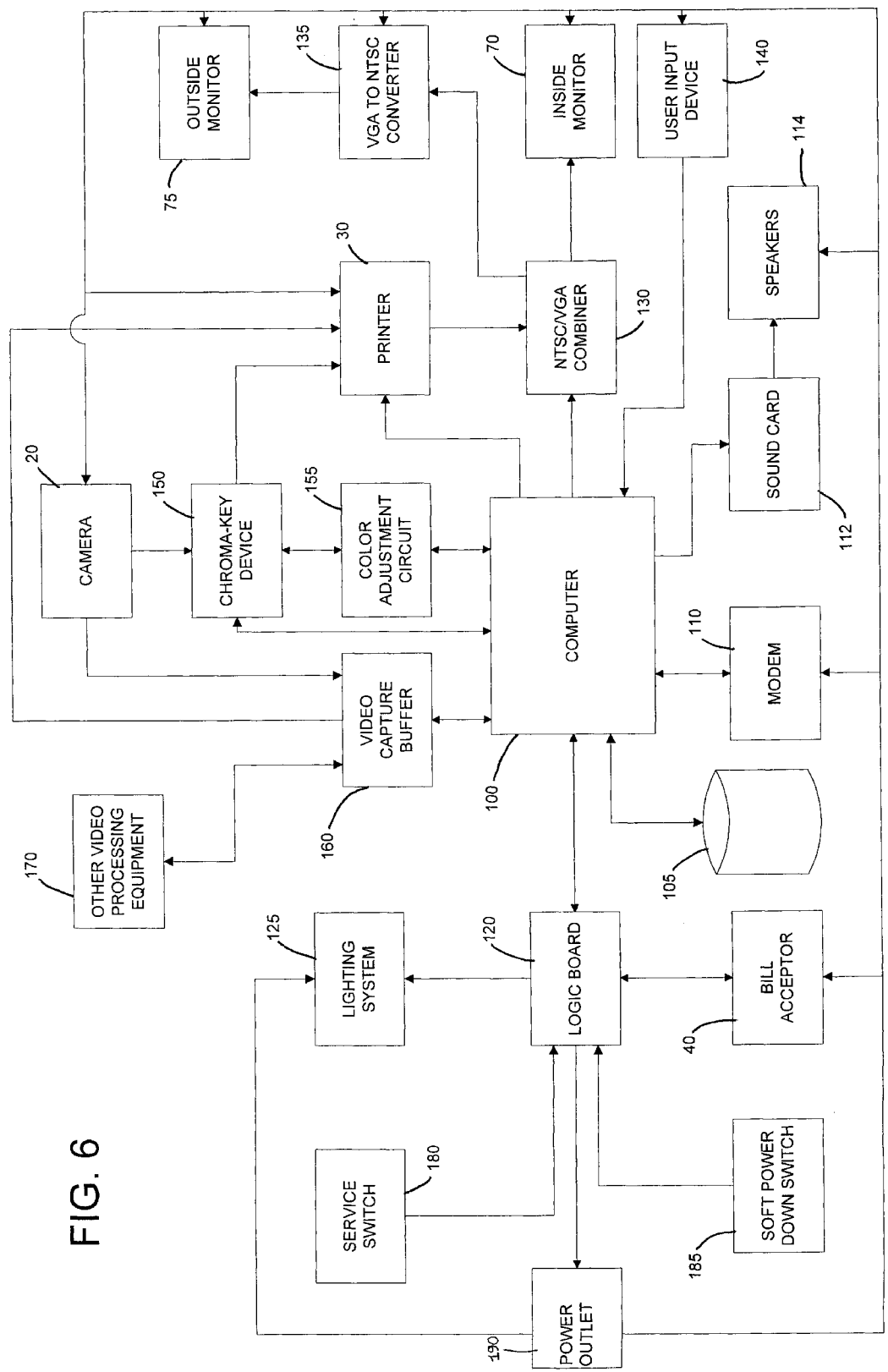
FIG. 6 is an electrical schematic in block form of an image processing system of the present invention.

As will be explained in greater detail below in connection with FIG. 6, the image processing system of the photobooth preferably includes a conventional analog chroma-key device that operates essentially in the same manner as described above in the background of the invention with the exceptions described below. To overcome the problems associated with utilizing a conventional chroma-key device in a photobooth, the present invention utilizes a novel lighting method to significantly curtail the likelihood that someone who is wearing blue clothing (or clothing having the same colors as the backdrop) would appear transparent when a composite image is to be produced.

Figure 4A:
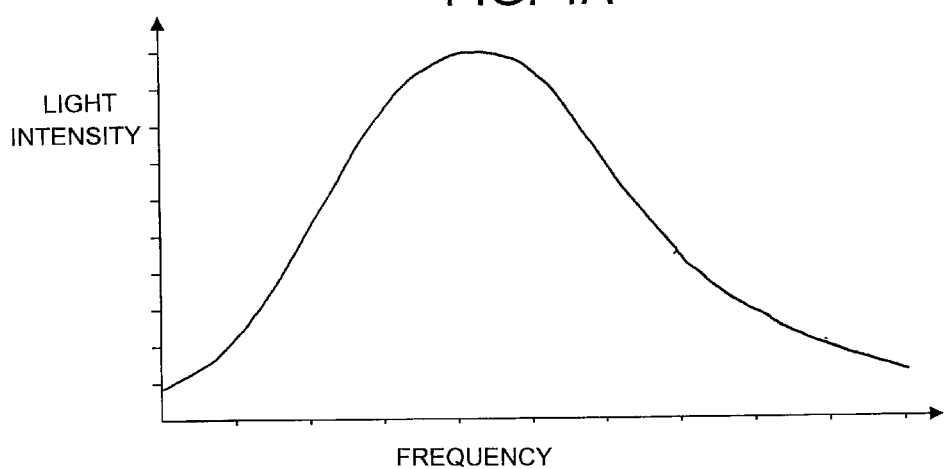
FIG. 4A is a line graph illustrating the spectral distribution of conventional white light source.
Figure 4C:
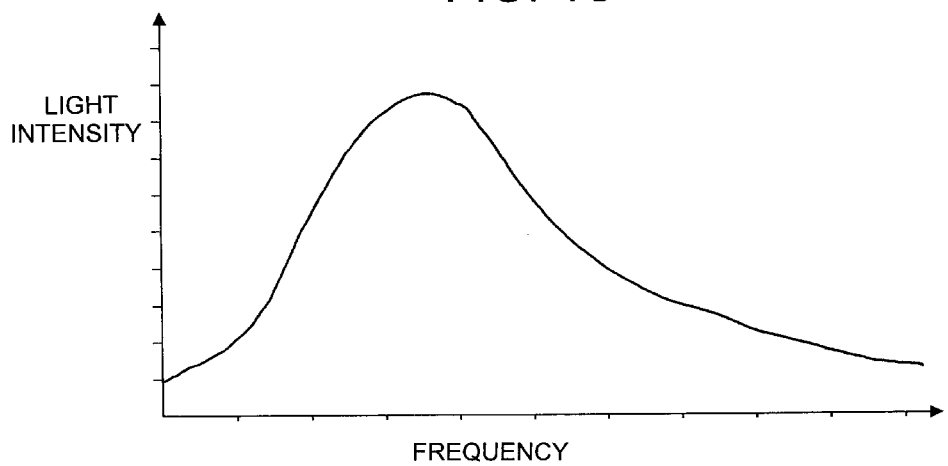
FIG. 4C is a line graph illustrating the spectral distribution of a low color temperature light source that may be used in or in connection with the present invention.
Figure 5A:
FIG. 5A is a bar graph illustrating the intensities of the RGB color components of a pixel of an exemplary foreground subject.
Figure 5B:
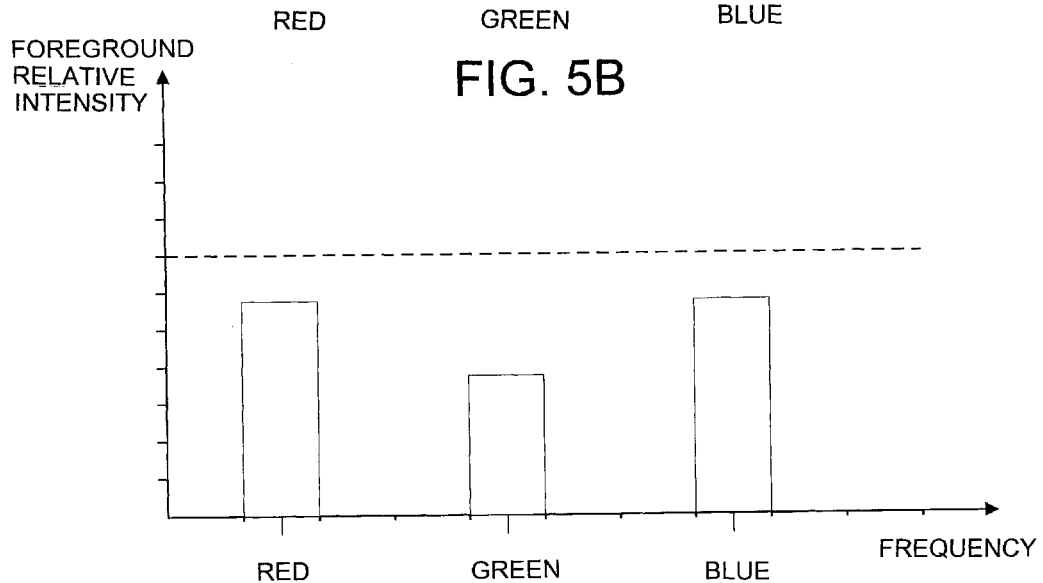
FIG. 5B is a bar graph illustrating the intensities of the RGB color components of a pixel of the exemplary foreground subject when illuminated with low color temperature light having a spectral distribution similar to that shown in FIG. 4C.
Figure 5C:
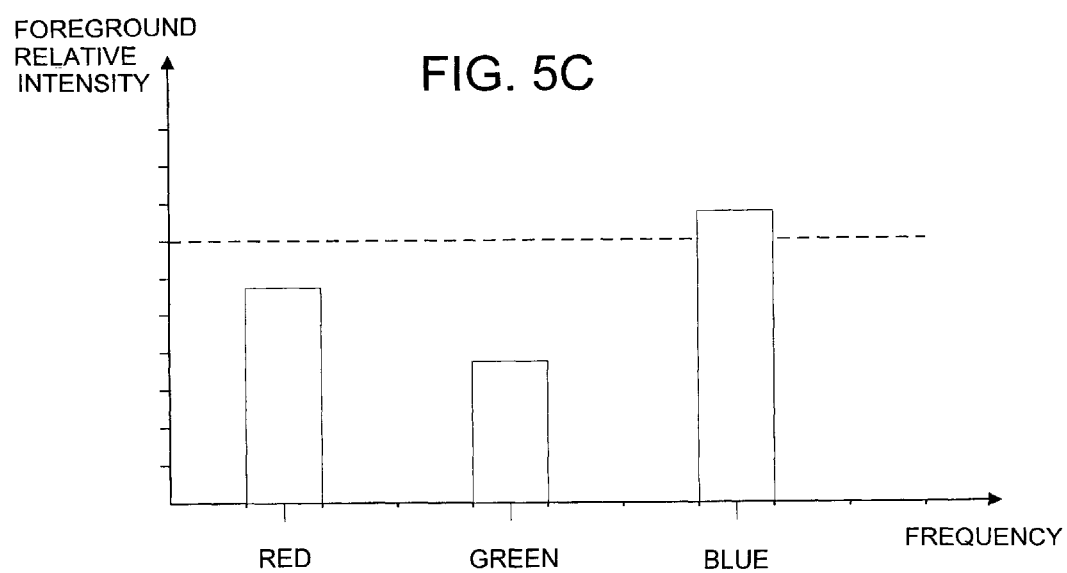
FIG. 5C is a bar graph illustrating the intensities of the RGB color components of a pixel of the exemplary foreground subject when illuminated with a low color temperature light and which is subjected to a color adjustment of the RGB component signals.

Conventional photobooths have typically illuminated the subject and backdrop utilizing conventional white lights, which have a spectral distribution like that shown in FIG. 4A. White light has been used to ensure the accurate reproduction of the colors of the foreground subject. The present invention takes a different approach by utilizing light sources 80a and 80b providing low color temperature illumination (i.e., illumination having the spectral distribution shown in FIG. 4C) to illuminate the foreground subject 22. Thus, as will be described with respect to FIGS. 5A–5C, the present invention purposely illuminates the foreground subject with a particular light source that does not produce accurate color reproduction of the foreground subject. In the event that a subject enters a photobooth constructed in accordance with the present invention while wearing clothing having a blue component that if illuminated with white light would cause the chroma-key device to take an action that would make the clothing appear transparent, as shown in FIG. 5A, the low color temperature illumination from light sources 80a and 80b tends to shift the colors of such clothing to have a blue component intensity that is now considerably lower and less likely to cause the chroma-key device to take an adverse action, as shown in FIG. 5B. Because the illumination from light sources 80a and 80b tends to alter the flesh tones of the subject 22, it is preferable to subsequently adjust the blue color component output from the chroma-key device to counter the effects of the low color temperature lighting and obtain an accurate color reproduction of the foreground subject as shown in FIG. 5C. Because this color adjustment is made to the output of the chroma-key device, the superimposition of the background image has already taken place and the altering of the blue component intensity at the output of the device to a higher level will be of no concern in terms of creating a transparency problem. Further, by adjusting the color of the pre-stored background images prior to storing or otherwise applying them to the chroma-key device, the adjustment of the output signals from the chroma-key device will not adversely effect the colors of the background image. Although FIGS. 5A–5C show a representation of the operation of the invention using an RGB color space, similar representations can be made using a YUV or other color space.

Figure 4B:
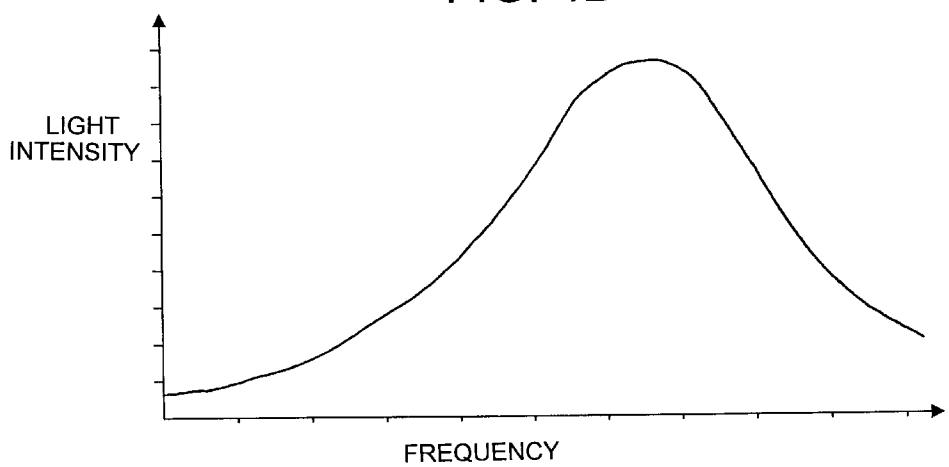
FIG. 4B is a line graph illustrating the spectral distribution of a high color temperature light source that may be used in or in connection with the present invention.

As an additional measure for preventing the foreground subject from appearing transparent in a composite image, light sources 90a and 90b are provided behind the subject to illuminate backdrop 25 with high color temperature light having a spectral distribution as shown in FIG. 4B. Such high color temperature lighting intensifies the blue color component of the backdrop as seen by the camera enabling the chroma-key device to be set such that it is even less likely to take adverse action with blue clothing. Further, the high color temperature lights 90a and 90b behind the subject lessen the effects of the low color temperature light that may impinge upon backdrop 25. Although any form of low color temperature lights 80a and 80b having a black body illumination temperature in the low 2000° range may be used, halogen light sources are preferred due to their availability and low cost and although there are much lower color temperature sources, halogens give good foreground color reproduction and low transparency when used with a high color temperature backdrop light source. High temperature lights 90a and 90b may be implemented using any conventional daylight fluorescent tube or a C75 bulb, which have black body illumination above 4500°.

Photobooth 10 also preferably includes white light sources (not shown) that may be turned on when a picture type other than chroma-key is selected. To ensure proper color reproduction, light sources 80a, 80b, 90a, and 90b are turned off when chroma-key is not selected. As an option, an additional high color temperature light source may be added to the foreground lighting when chroma-key is not selected to complement low color temperature lights 80a and 80b.

Having described the basic construction of photobooth 10, a detailed description of the image processing components of the photobooth are described below with reference to FIG. 6. The image processing and control circuit of the present invention is preferably implemented using two separate processors. The first processor is that included on a conventional motherboard of a personal computer 100 and the second is a microprocessor included on a separate logic board 120. In general, the processor in computer 100 controls the image processing functions, while the processor in logic board 120 serves as an interface for controlling the lighting system 125, which includes lights 80a, 80b, 90a, and 90b, and any white light sources, and for communicating with both bill acceptor 40 and a power outlet 190, which supplies power to the various components of the image processing system and the photobooth. Logic board 120 is also coupled to a service switch 180 and a soft power down switch 185 to detect when these switches have been turned on and off. Logic board 120 is coupled to computer 100 to relay this information to computer 100 and to receive instructions for controlling the lights and bill acceptor. Logic board 120 also acts as a watchdog by monitoring computer 100 to ensure that computer 100 does not become hung-up. As will be described in greater detail below, logic board 120 will reset computer 100 in the event that computer 100 becomes hung-up.

Computer 100 is preferably adapted to be coupled to a sound card 112, such as a sound blaster card, for connecting speakers 114. Speakers 114 may be utilized for playing introductory music or messages, for providing instructions to a user, and/or for providing an audible countdown within the photobooth to warn the subject when the photograph is about to be taken. Computer 100 also preferably includes a hard drive 105 and a modem 110 that may be coupled to a phone line or other communication link to provide remote access and communication with computer 100. By providing modem 110, a photobooth operator may obtain diagnostic information while at a location that is remote from the photobooth. Also, the provision of a modem 110 allows an operator to download new and additional background images that may be utilized in producing a composite photograph using chroma-key and new pictures of celebrities that may be used for morphing.

Computer 100 also preferably includes a video driver board that is coupled to an NTSC/VGA combiner that is coupled to the input terminal of inside monitor 70. NTSC/VGA combiner 130 is provided to receive VGA signals from computer 100 and NTSC signals from printer 30 and to provide an image to a VGA inside monitor 70 depicting the information provided by computer 100 and the image signals output from printer 30. NTSC/VGA combiner 130 also provides an output to a VGA to NTSC converter 135, which converts the output VGA signal from combiner 130 to an NTSC signal suitable for delivery to a television monitor 75 which may be mounted on the outside of the photobooth. Alternatively, if the outside monitor 75 is a VGA monitor, VGA to NTSC converter 135 would not be needed.

As described above, inside monitor 70 is preferably overlaid with a touch screen input device 140 which provides user input signals to computer 100 in response to the user touching portions of the display screen of inside monitor 70. Although a touch screen is described as the preferred type of user input device 140, those skilled in the art will appreciate that other user input devices could be implemented. By utilizing a touch screen user input device 140, a wide variety of user input menus may be readily implemented and subsequently altered without requiring any modification to the hardware of the system. Thus, the user interface may be kept simple and easy to use without requiring a high level of sophistication on the part of the user.

As mentioned above, the image processing system of the present invention utilizes a conventional analog chroma-key device 150 which receives the RGB analog video signals output from camera 20 and the background images prestored on hard disk 105 or other memory media from computer 100. The method employed by this invention will work with any chroma-key device which relies on a primary color, or relative amount of a primary color, to determine its action. Further, other color spaces such as YUV may be used. One example of such a chroma-key device is disclosed in U.S. Pat. No. 4,811,084 issued to Belmares-Sarabia et al. A color adjustment circuit 155 is preferably provided to adjust the output color of the image output from chroma-key device 150 in the manner discussed above with respect to FIG. 5C. Most conventional analog chroma-key devices 150 include an output color adjustment circuit that may be controlled manually or by a computer 100. The output signals of chroma-key device 150 are provided to printer 30 which stores and continuously updates an image in a page memory buffer within printer 30. The image in the page buffer is printed on paper when a print command is received from computer 100. The continuous video signal provided from chroma-key device 150 is also passed through printer 30 to NTSC/VGA combiner 130 for output to the inside and outside monitors 70 and 75.

This system is also preferably provided with a video capture buffer 160 that is coupled between camera 20 and printer 30 so as to receive the video signal from camera 20 and to capture a frame image of the signal when enabled by computer 100 so as to relay the captured image frame to printer 30 for printing or to computer 100 for processing and subsequently to printer 30 for printing, depending on the type of picture process selected. The system may also include other forms of video processing equipment 170 as may be desired for other image processing applications.

Having described the hardware of the image processing system of the present invention, the operations performed by the system will now be described with reference to the flow diagrams shown in FIGS. 7A–7F, 8, and 9. FIGS. 7A–7F illustrate a flow diagram of the steps that are executed by computer 100 to implement the photobooth operating system 200 of the present invention. The photobooth operating system 200, which is performed by the processor in computer 100, begins in FIG. 7A with the processor communicating with logic board 120 to determine whether soft power down switch 185 is on or off (step 202). If power switch 185 is turned on, the process proceeds to step 212 (FIG. 7B) which is the portion of the photobooth operating system (PBOS) routine that is carried out when the power is on. Next, provided the power has not been turned on, the process proceeds to step 204 where the computer 100 checks whether a modem carrier has been detected. If no modem carrier has been detected, the processor resets the logic board counter in step 205 and returns to step 202 to check whether the power has been turned on. The processor remains in this loop until either the power is turned on or a modem carrier has been detected. The processor continues to reset the logic board counter in step 205 to keep logic board 120 appraised of the fact that the computer is functioning properly. As will be explained in more detail below, logic board 120 includes a counter that, if allowed to count to a preprogrammed time (e.g., ten minutes), will cause logic board 120 to reset computer 100. Thus, to ensure that logic board 120 does not reset computer 100 prematurely, the processor in computer 100 routinely resets the counter in logic board 120.

If during a power down state a modem carrier is detected in step 204 of PBOS routine 200, computer 100 gets a user file request or command in step 206 and responds to the request by sending and/or receiving files to the user or operator who is calling into the photobooth remotely in step 208. Once computer 100 has executed the requested file request or commands, it hangs up the modem in step 210 and resets the logic board counter in step 205 and then continues in the previously-described loop until the power is turned on or another modem carrier is detected. It should be noted that all service routines, such as a modem file send/receive routine just described, preferably periodically reset the logic board counter. As stated above, an operator may remotely download background images or other images that are used by the photobooth in performing its image processing operations. The operator may also retrieve system status information and perform diagnostics on the system over the modem. Thus, if all that is wrong with the photobooth is that it is out of paper, an operator may discover this fact remotely and call up the manager of the location in which the photobooth is operated and have them install paper in the printer. In this manner, service is performed more quickly and efficiently and at a lower cost. Further, by allowing an operator to download and change background images on a photobooth, the background images may be continuously changed without adding prohibitive costs associated with sending the operator to each and every location at which a photobooth is located.

When soft power down switch 185 is pressed during the power off loop of PBOS routine to turn the power on, computer 100 detects the operation of switch 185 through a status file request sent to logic board 120. In response to an actuation of switch 185, processor 100 advances to step 212 (FIG. 7B) in which it detects whether a modem carrier is present. If no modem carrier is detected, the process advances to step 214 where processor 100 checks whether the soft power down switch 185 has been turned off. If a modem carrier has been detected in step 212, processor 100 gets the user file request in step 216, sends and receives files in response to the request in step 218, and then hangs up the modem in step 220 prior to advancing to step 214.

If the soft power down switch 185 has been turned back off, processor 100 detects this in step 214 and performs a soft shutdown in step 222 by turning off the lights and interrupting the power to the various components of the photobooth. It then performs an orderly shutdown of all programs running and executes a cold reboot. The reboot process restarts the PBOS and returns to step 202 (FIG. 7A) of the power off loop of PBOS routine 200. The purpose of this is to free system resources. In a high level operating system, many software routines may be utilized and some may not release resources (in particular, memory) back to the operating system. If soft power down switch 185 remains on in step 214, computer 100 executes step 224 in which it sends a status request to logic board 120 in order to determine whether the service switch 180 has been turned on. If it has, the PBOS routine advances to step 230 (FIG. 7C) otherwise the routine advances to step 226 in which computer 100 checks the status of printer 30 to determine whether there is paper in the printer. If there is paper in the printer, PBOS routine 200 advances to step 270 in FIG. 7E. If there is no paper in the printer, the routine advances to step 228 which causes computer 100 to display an "out of paper" message on inside display monitor 70 as well as the optional outside monitor 75. This display will remain on the monitors until paper is placed in the printer. Next, computer 100 resets the logic board counter in step 229 prior to returning to step 212 in which computer 100 checks whether a modem carrier has been detected. Computer 100 continues to loop through these steps until either the power down switch 185 is turned off, the service switch 180 is turned on, or paper is placed in the printer.

When the service switch is turned on, its actuation is detected in step 224 of the PBOS routine. As apparent from the flow diagram, the power down switch 185 must first be turned on before the service switch is actuated. When service switch 180 is actuated, computer 100 displays a system status screen on inside monitor 70 (step 230 in FIG. 7C) and waits for the user to press the "next screen" soft key (step 232) which is displayed on the display system status screen and actuated by pressing on the display screen on monitor 70 in a region corresponding to the "next screen" soft key. The system status screen includes various diagnostic and status information, including statistics on the number of photographs taken, the amount of money received, and the particular types of photographs that were requested. While computer 100 waits for the user to press the "next screen" soft key, it checks whether the service switch has been turned off in step 234 while periodically resetting the logic board counter 235. If the service switch has been turned off before the "next screen" soft key is actuated, the routine returns to step 212 (FIG. 7B) as indicated by connector B1. If the user presses the "next screen" soft key, the routine advances from step 232 to step 236 in which computer 100 displays a "module add/update screen" on inside monitor 70.

The module add/update screen provides the user with at least four selectable options including an "add module" option, a "update module" option, an "enable/disable module" option, and a "delete module" option, as well as a "next screen" option. These options are all displayed using soft keys on inside monitor 70 which may be selected by pressing the corresponding area on the display screen of monitor 70. If the user presses the "add module" soft key, computer 100 detects this in step 238 and responds by copying and storing any new module files and program routines (step 240) that are included on a machine readable and portable data storage medium, such as a floppy disk, that is inserted into computer 100. Such modular program routines may include new photography options for the end user to select when they enter the photobooth. For example, such a module to be added may include the chroma-key composite image photograph as discussed above, a morphing option, a photo identification (ID) option, or various other picture-type options—some of which are discussed below. When a new program routine is downloaded to disk 105, a display screen that informs the operator of the program routines stored on disk 105 is reconfigured to identify the new routine and show that it is presently disabled. By allowing such modules to be added to the system and subsequently enabled, photobooths deployed in the field may be easily modified and updated by downloading these program modules into the computer's memory and reconfiguring the display options menu that is displayed to the end user by reconfiguring it in such a manner as to display a new soft key associated with the new module being added. It is contemplated that these new modules may be programmed by the photobooth operator or by any third party and added to the PBOS routine provided these new modules meet all the parameters specified by the PBOS routine. It is further contemplated that the PBOS routine would define parameters (i.e., commands for the image processing equipment and requirements for generating and outputting reset signals to the logic board processor) and allow for such new program modules to be executed in a manner similar to Microsoft's WINDOWS operating system or a DOS operating system. Moreover, by utilizing standardized plug-and-play parameters that are similar to those used in Microsoft's WINDOWS 95, the installation of a new program module would automatically cause the user option display menu to be reconfigured so as to include an icon or soft key that, when actuated, will initiate the execution of the new module to its completion, at which point the control of computer 100 would return to the PBOS routine. The PBOS routine also would include support for, as well as simplified methods for adding support for, different types of hardware that may be used in the booth such as printers, bill readers, chroma-key devices, combiners (NTSC/VGA), converters, etc.

If the user presses the "update module" soft key that is displayed on the module add/update screen, computer 100 detects this actuation in step 242 and responds by displaying all the program routine modules presently stored in the computer's memory and by updating selected module files in step 244. The option allowing an operator to update existing module program files stored in computer 100, allows for the updating and improvement of existing programs in the photobooth thereby facilitating improvements in such programs due to the ease at which they may be implemented in existing photobooths.

The module add/update screen also displays an option for the user to enable or disable a particular existing program routine module resident on the computer hard drive 105. In this manner, if a program module is not operating effectively or not operating at all, it may readily be disabled so as to allow the continued use of the photobooth provided at least one program module remains enabled. Further, this feature allows for an operator to change the options that are presented to the end user from time-to-time without removing or adding new program modules from the photobooth memory. When the operator selects the enable/disable option, all the program routines stored in memory and their enabled/disabled status are displayed on monitor 70. The operator may then toggle between enabled/disabled states for a selected program. These steps are carried out in the manner designated in steps 246 and 248.

In step 250, the PBOS routine 200 instructs the computer 100 to determine whether the user has pressed the "next screen" soft key that is displayed on the module add/update screen. If the user has not pressed the "next screen" soft key, computer 100 determines whether the service switch has been turned off in step 252. If the service switch has been turned off, the PBOS routine returns to step 212 (FIG. 7B) as indicated by the B1 connector. If the service switch has not been turned off, on the other hand, computer 100 resets the logic board counter in step 253 and returns to step 238 to determine whether the user has pressed one of the soft keys on the currently-displayed screen. Once the operator has finished with the module add/update screen, the operator actuates the "next screen" soft key causing computer 100 to advance to step 254 (FIG. 7D) in which computer 100 displays the system set-up screen.

Figure 7A:
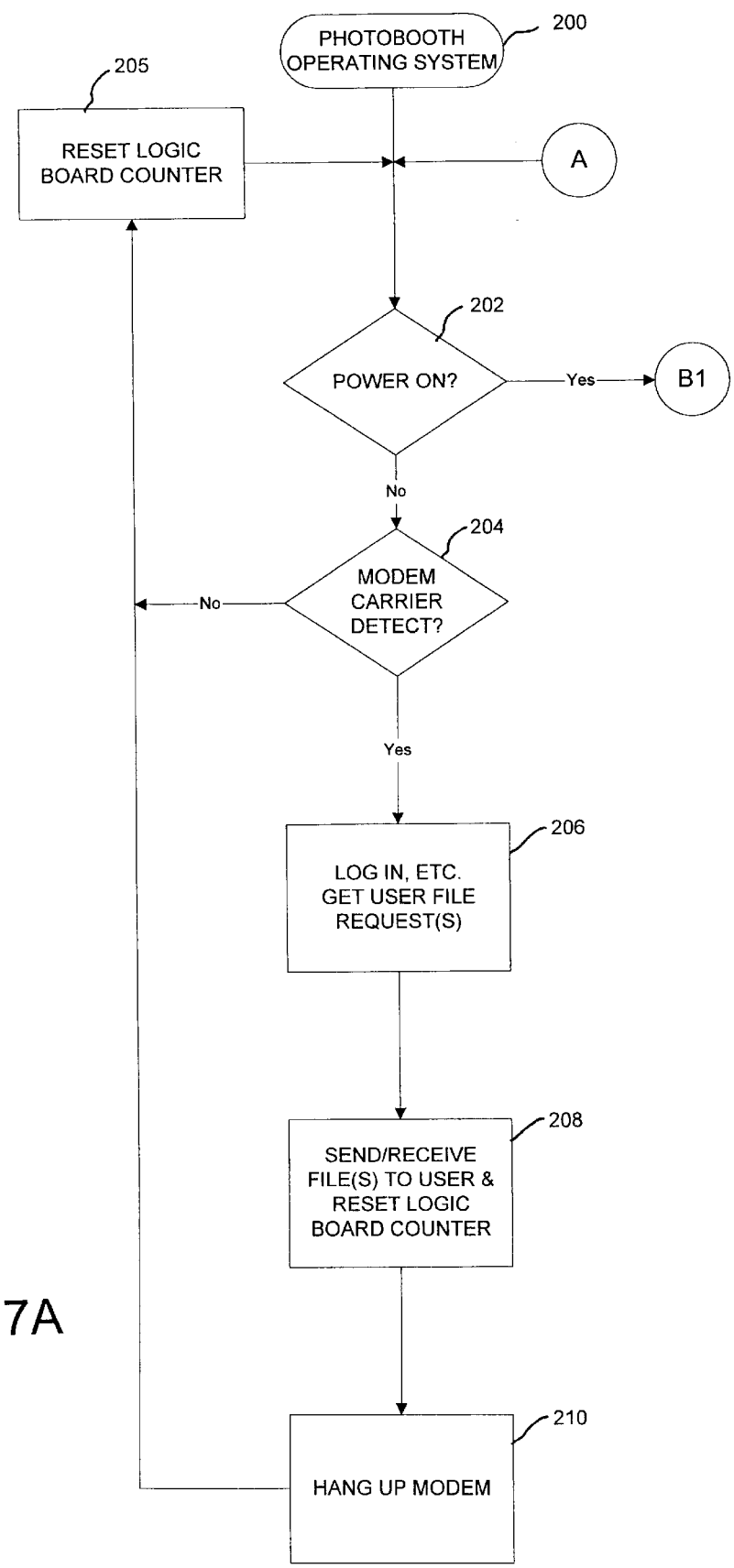
FIGS. 7A–7F are flow diagrams illustrating the steps executed by computer 100 to implement the photobooth operating system of the present invention.
Figure 7B:
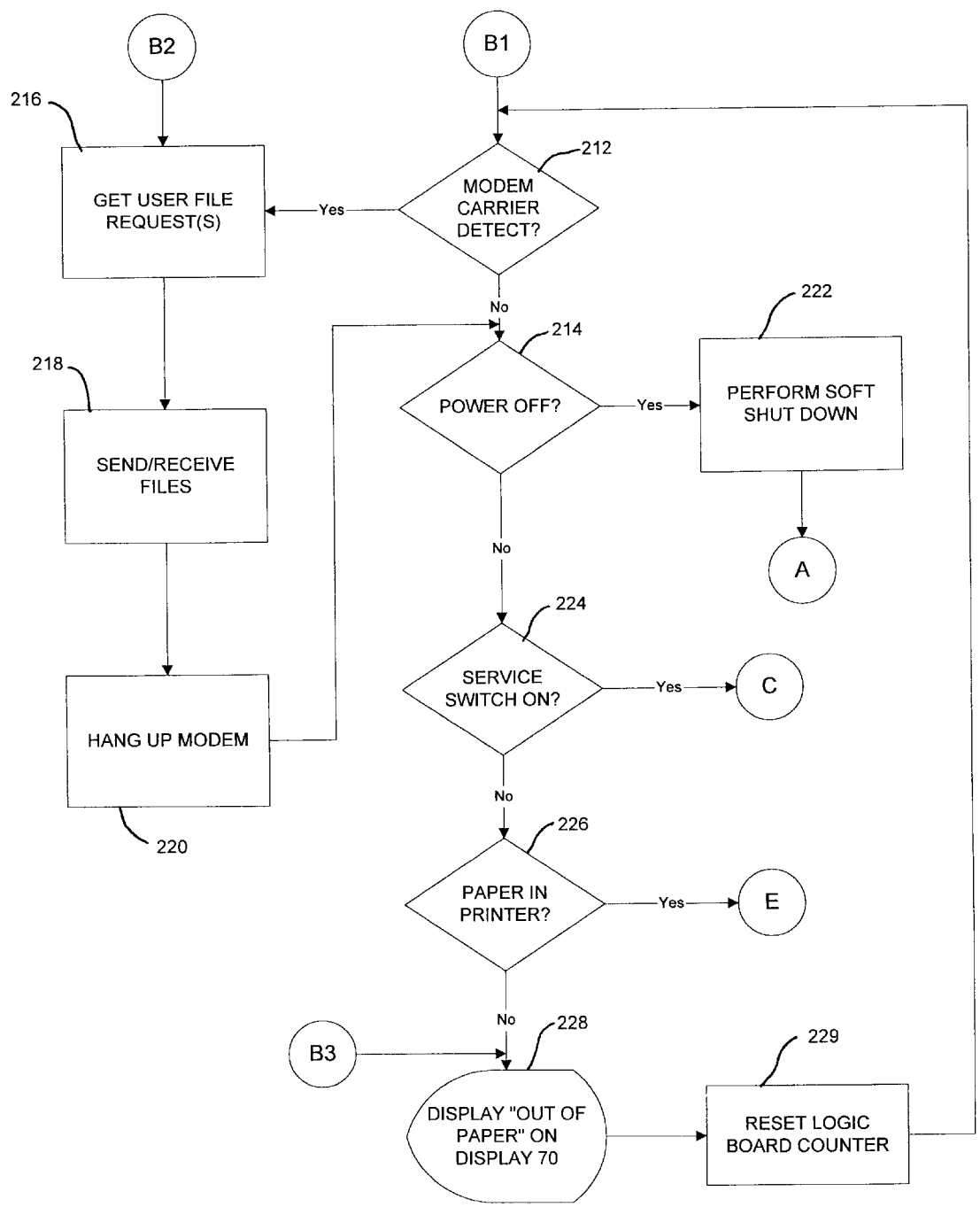
Figure 7C:
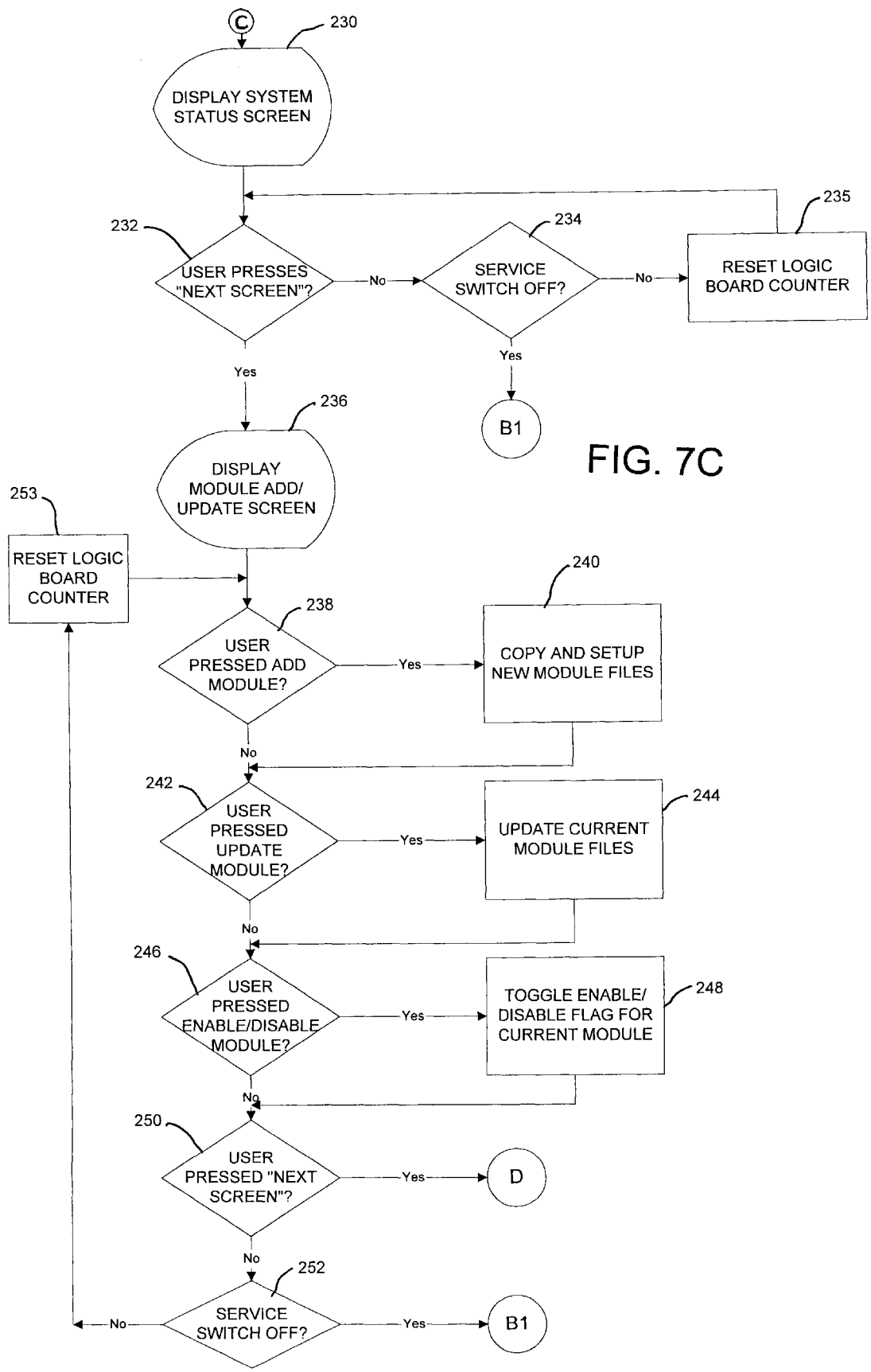
Figure 7D:
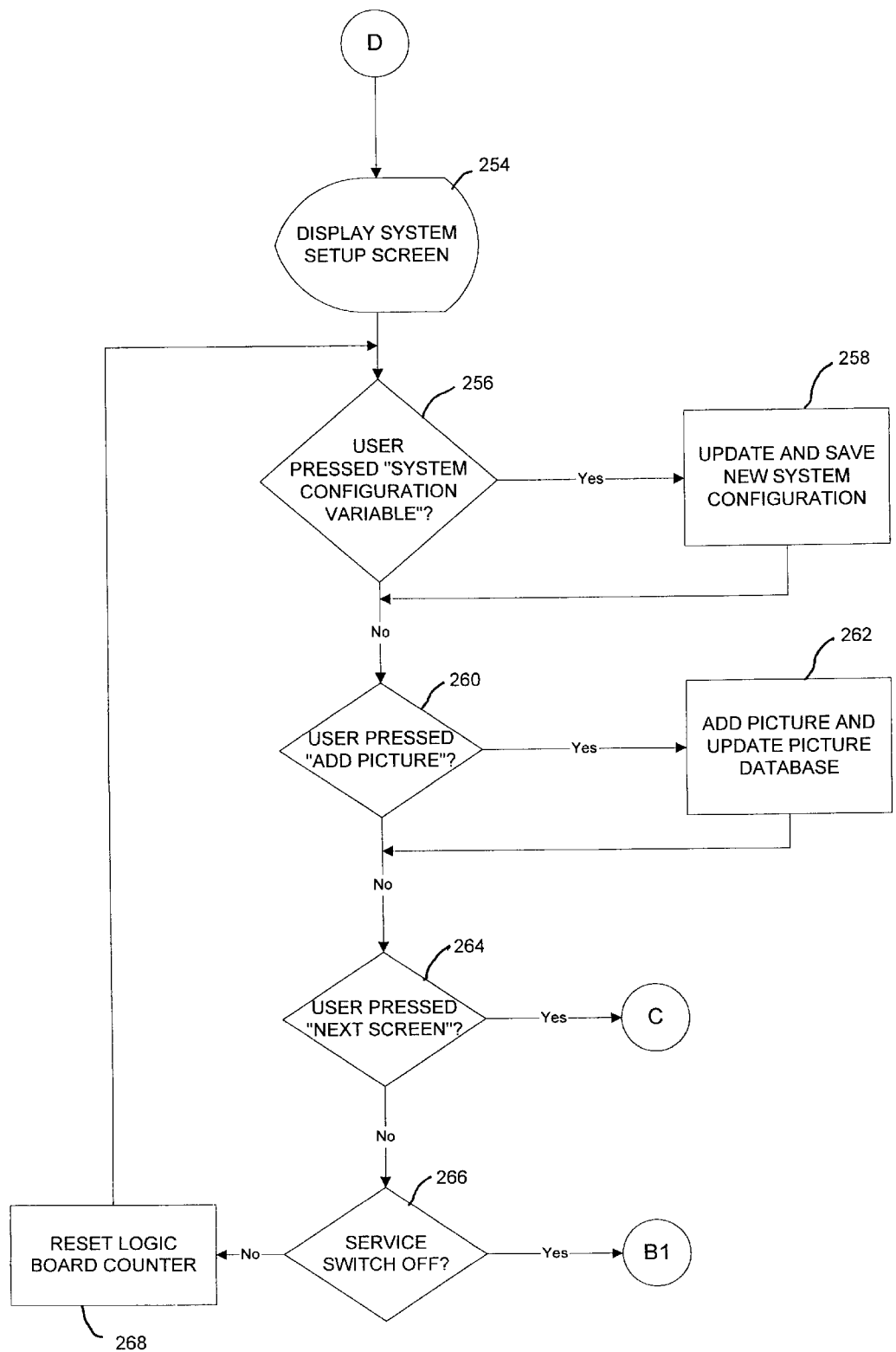
Figure 7E:
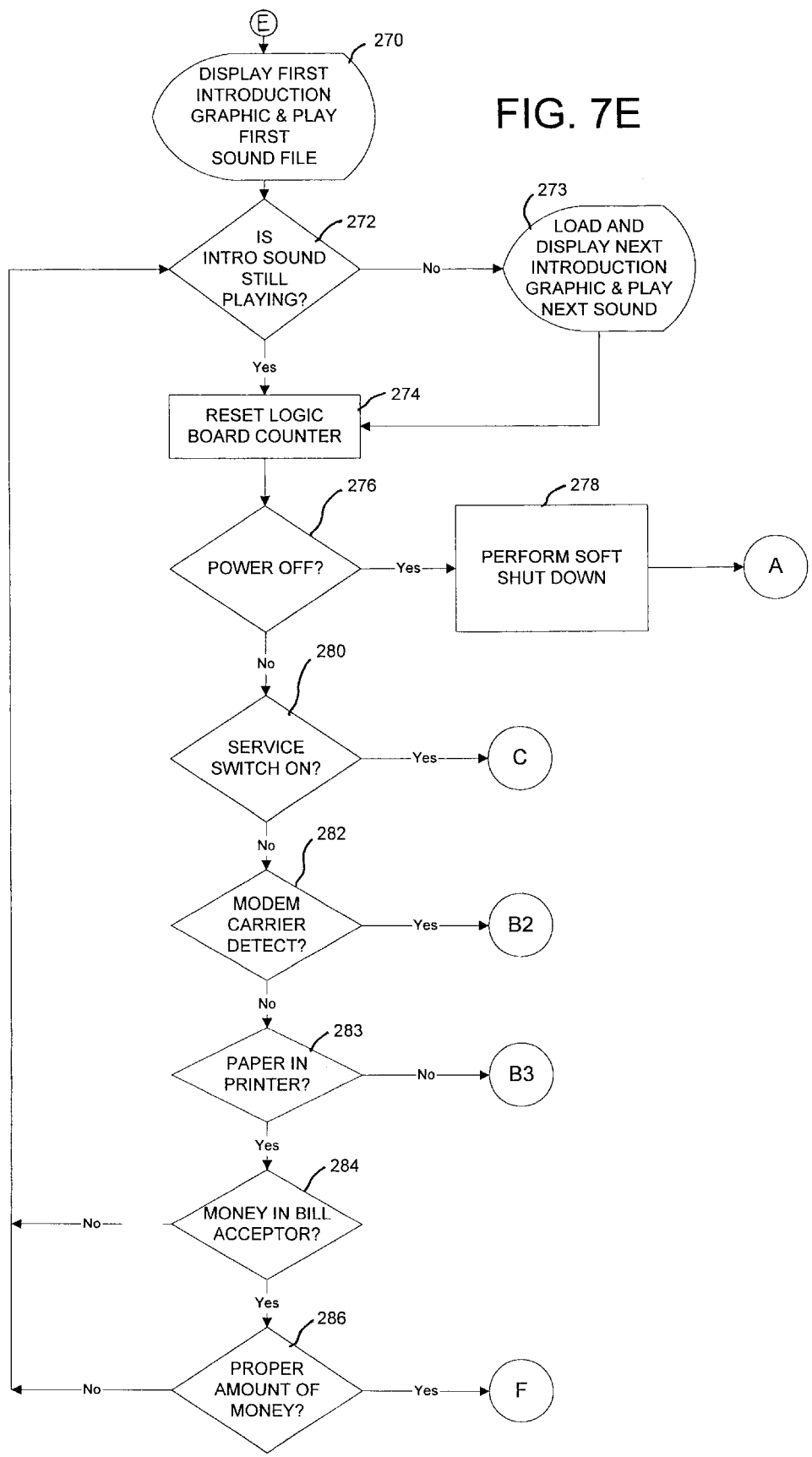

The system set-up screen displays at least three options to the user including an option to add, modify, or remove a system configuration variable or hardware component; an option to add a picture to the system picture database; and the option to have the next screen displayed. In step 256, computer 100 checks whether the user has pressed a soft key corresponding to a system configuration variable, and responds to such actuation by updating and saving any new system configuration or making any other requested system configuration changes in step 258. If the user presses the "add picture" soft key, computer 100 detects this in step 260 and adds the picture by updating the picture database in step 262. On the other hand, if the user presses the "next screen" soft key, computer 100 detects this in step 264 and proceeds back to step 230 (FIG. 7C) in which the system status screen is once again displayed on inside monitor 70. If the service switch is then turned off, computer 100 advances back to step 212 in FIG. 7B as indicated by the B1 connector. If the service switch is still on, the computer resets the logic board counter in step 268 and returns to step 256 in order to determine whether the user has pressed any of the options on the system set-up screen. Returning to FIG. 7B, if it is determined in steps 214, 224, and 226 that the power is on, the service switch is off, and that there is paper in the printer, the routine advances to step 270 which is shown in FIG. 7E.

Step 270 causes computer 100 to display the first introduction graphic on the inside and outside monitors 70 and 75. Such graphics show the various features of the photobooth and are intended to attract the end users to enter and use the photobooth. At this same time, computer 100 loads and plays the first introduction sound which is played through the sound card 112 over speakers 114. Again, such sounds are intended to audibolize the features of the photobooth and to play music that is likely to draw attention to the photobooth. Then, in step 272, computer 100 checks whether the introsound is still playing. If it is still playing, the computer executes step 274, otherwise the computer loads and displays the next introduction graphic and plays the next sound file in step 273 before advancing to step 274. In step 274, computer 100 resets the logic board counter prior to proceeding to step 276 which causes computer 100 to determine whether the soft power down switch 185 has been turned back off. If it has been turned off, computer 100 performs a soft shutdown 278 and returns back to step 202 as shown by connector A. If the power remains on, computer 100 then checks whether service switch 180 has been turned on in step 280. If the service switch 180 has been turned on, the computer 100 returns to execute step 230 (FIG. 7C) as indicated by the connector C. If the power is on and the service switch remains off, computer 100 then checks whether a modem carrier has been detected in step 282. If a modem carrier has been detected, the computer executes step 216 (FIG. 7B) as indicated by connector B2. If no modem carrier is detected, computer 100 executes step 283 to determine whether there is still paper in the printer. If there is no paper in the printer, the routine returns to step 228 (FIG. 7B) as shown by connector B3. If there is paper, the routine advances to step 284 to inquire the status of the bill acceptor 40 through logic board 120. If there is no money in the bill acceptor, computer 100 returns to step 272 where it checks to see if the sound file is done playing. If the sound file is no longer playing, computer 100 executes step 273 causing it to load and play the next sound and load and display the corresponding introduction graphic. Computer 100 then executes step 274. If money is placed in the acceptor, computer 100 then checks to determine whether the proper amount of money has been deposited (step 286). The PBOS routine continues to loop back through steps 272–286 to continue to display the next introduction graphic until the proper amount of money has been deposited in the bill acceptor. This condition is detected in step 286, thus causing computer 100 to then execute step 288 shown in FIG. 7F.

In step 288, computer 100 loads and displays the picture-type selections on the inside monitor 70. These picture-type selections may include any one or combination of the following options: chroma-key 292, morphing 293, picture ID 294, passport photo 295, video overlay 296, basic photograph 297, and any other picture-type selection options 298 that are available or subsequently made available as per the above discussion on the photobooth using the PBOS routine. The user then manually selects the picture type that is desired by pressing a corresponding soft key indicia area on the display screen of monitor 70 (step 290). Upon the selection of the picture-type option, PBOS routine 200 calls the appropriate program module routine associated with the selected option. Computer 100 then executes the steps of the selected routine and, when finished, it returns control to the PBOS routine at step 270 (FIG. 7E) as indicated by connector E.

Figure 7F:
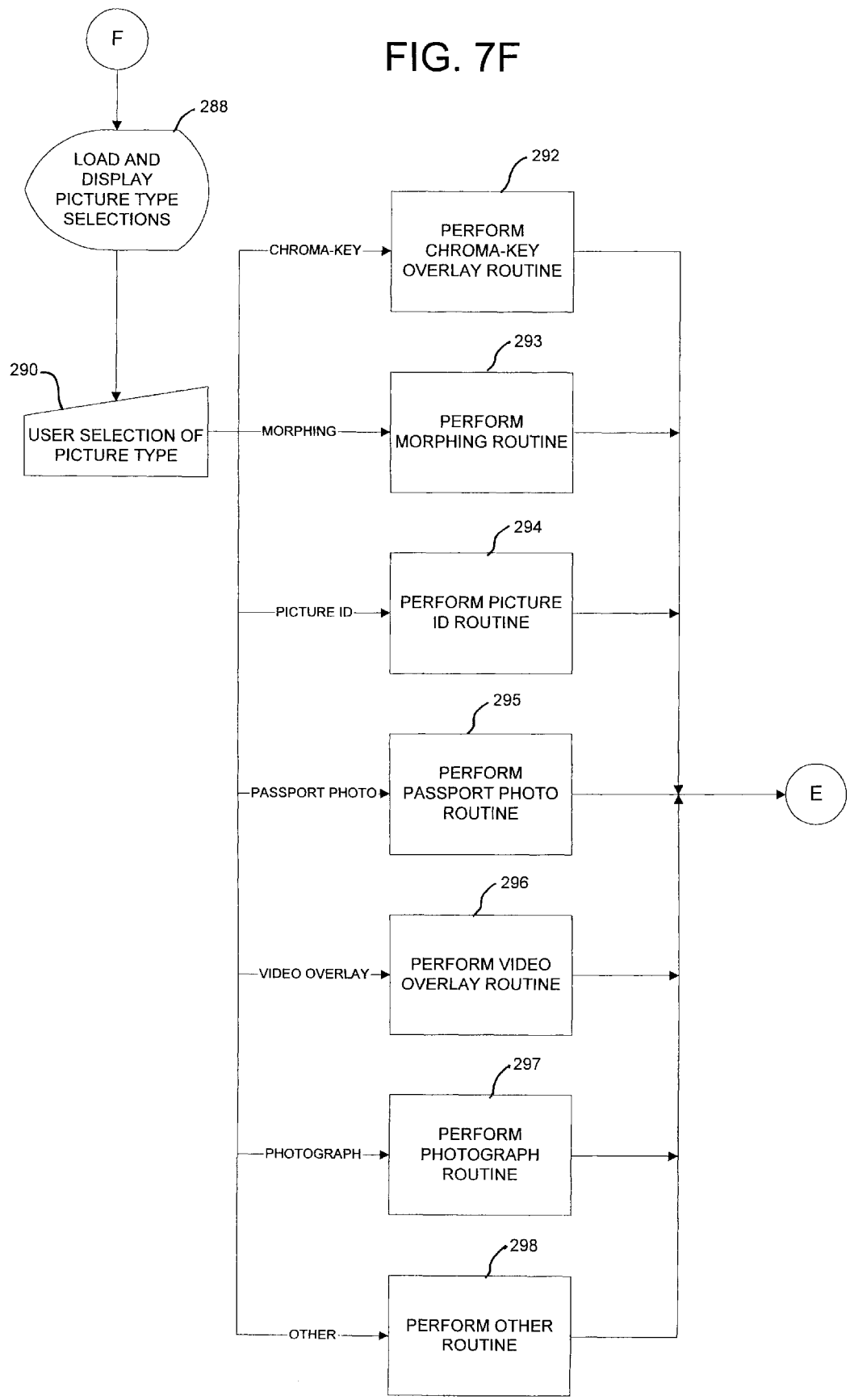
Figure 8:
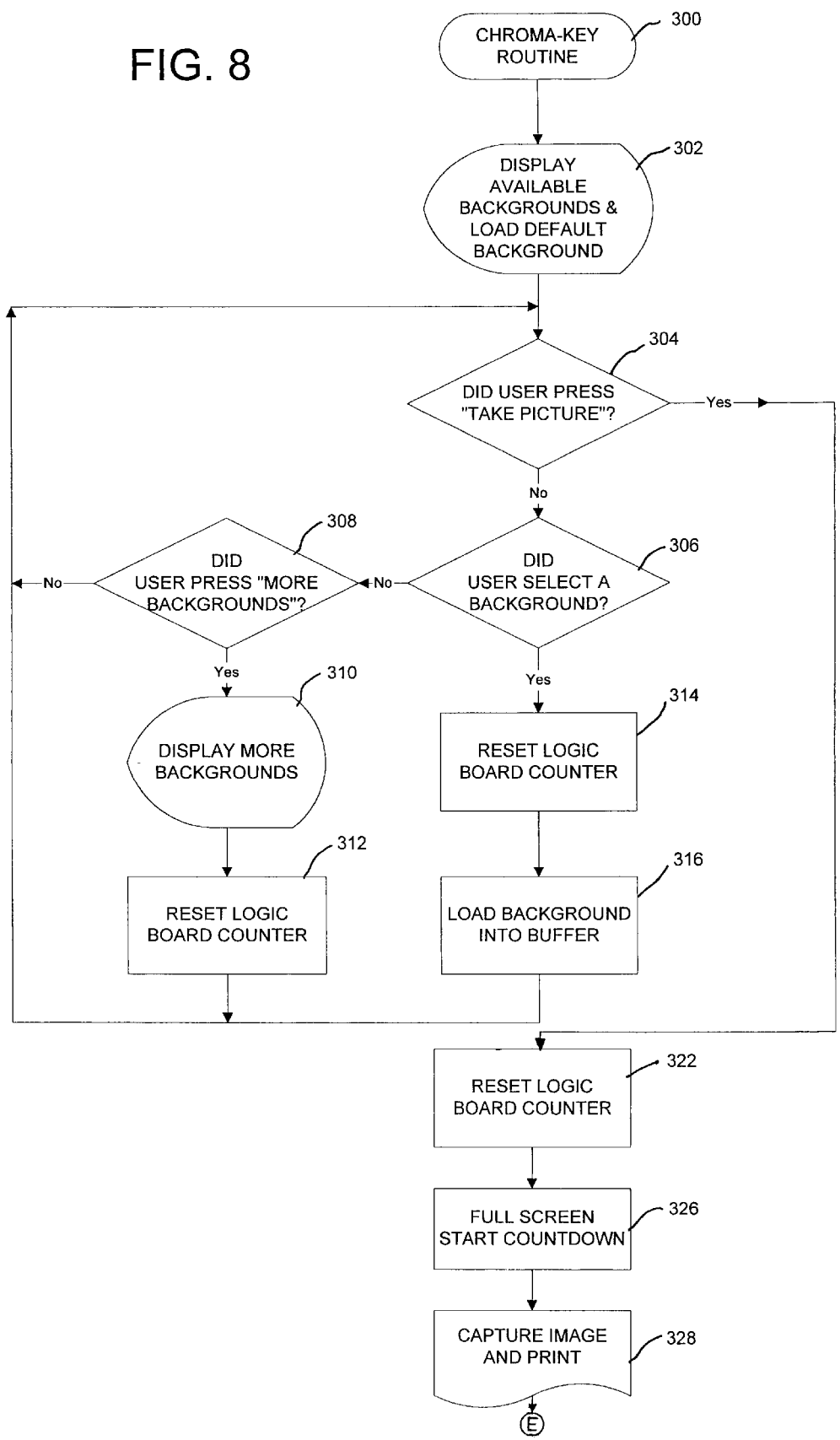
FIG. 8 is a flow diagram illustrating the steps that are executed by computer 100 to perform the chroma-key routine in accordance with the present invention.

FIG. 8 shows a flow diagram for the chroma-key routine that is executed by computer 100 when the chroma-key picture-type option is selected by the user in steps 290 and 292 of FIG. 7F. The computer 100 enables the chroma-key device 150 and camera 20 and determines whether the appropriate lights (i.e., lights 80a, 80b, 90a, and 90b) are turned on for a chroma-key picture so as to enable the chroma-key device to output a composite video image with a live view of the foreground subject in front of the selected background image. Chroma-key routine 300 begins by displaying the available backgrounds on inside monitor 70 and loading a default background into the chroma-key buffer (step 302). Because a large number of available background pictures may be available in any given photobooth, a predetermined number of such background pictures may be displayed at any one time on display monitor 70 and a soft key option to display more background images may be provided on display screen 70 so that the user may have the option to view additional background images for selection. In this manner, a large number of background images may be included for selection by the user. Also, at an outer portion of the display on monitor 70, a "take picture" soft key is displayed which the user presses when ready for the photograph to be taken. In addition, a small preview window displays a live image of the user in front of the selected background or the default background. At the same time, computer 100 displays the live foreground subject image superimposed on the selected background image on the outside monitor 75 so that others outside the photobooth may view the rather unique features of the photobooth while in operation. The user may select the desired background picture simply by pressing on the touch screen in the vicinity of the displayed background picture that is desired. The preview window then changes to display the user in front of that background.

The chroma-key routine continues in step 304 in which the computer determines whether the user selected the "take picture" option. If "take picture" was not selected, computer 100 advances to step 306 in which computer 100 determines whether the user selected a background. If a background was not selected, computer 100 advances to step 308 in which computer 100 determines whether the user pressed the "more backgrounds" soft key. If the user did not press this soft key, the routine returns back to step 304 to determine whether the user selected "take picture." If the user did press the "more backgrounds" soft key, computer 100 responds by displaying more background pictures on inside monitor 70 (step 310) and outside monitor 75 and may reset the logic board counter in step 312 before returning to step 304. If the user did select a background by touching the screen in the vicinity of the image, computer 100 loads the selected background into the chroma-key buffer in step 316, and then displays a live image of the user in front of the selected background in the small preview window. In this manner, the user may continue to select the "more backgrounds" soft key and preview various backgrounds until the user decides which background picture to select. Once the user selects the "take picture" option, computer 100 first resets the logic board counter in step 322.

The computer 100 then advances to step 324 where it instructs the user through audio files and images in how to adjust the seats, to remove glasses to prevent glare, and to perform other preparatory tasks. The computer then advances to step 326 in which the image of the user is made full screen and a countdown is initiated. The countdown may include a visual counter displayed on inside monitor 70 and/or may include an audible countdown delivered over speakers 114. By providing the countdown, the subject or subjects in the photobooth will be ready when the photograph is taken. When the countdown is finished, the photograph is taken by the computer 100 by supplying a capture image command to printer 30 which responds by capturing the image frame that is currently stored in its frame memory buffer. Printer 30 then prints the composite image from its frame buffer (step 328) prior to returning control to the PBOS routine at step 270 (FIG. 7E) as indicated by the return connector 330 in FIG. 8 and the E connector in FIG. 7E.

In the event the user selects a picture type in step 290 other than the chroma-key composite picture discussed above, the appropriate devices are enabled or disabled by computer 100 and the video signal obtained by camera 20 is fed to the appropriate device or to video capture buffer 160, which feeds the video image to printer 30 and/or a captured video frame to printer 30 when a countdown has been completed following an actuation of a "take picture" soft key that is displayed while performing the routine associated with the selected picture-type option.

Figure 9:
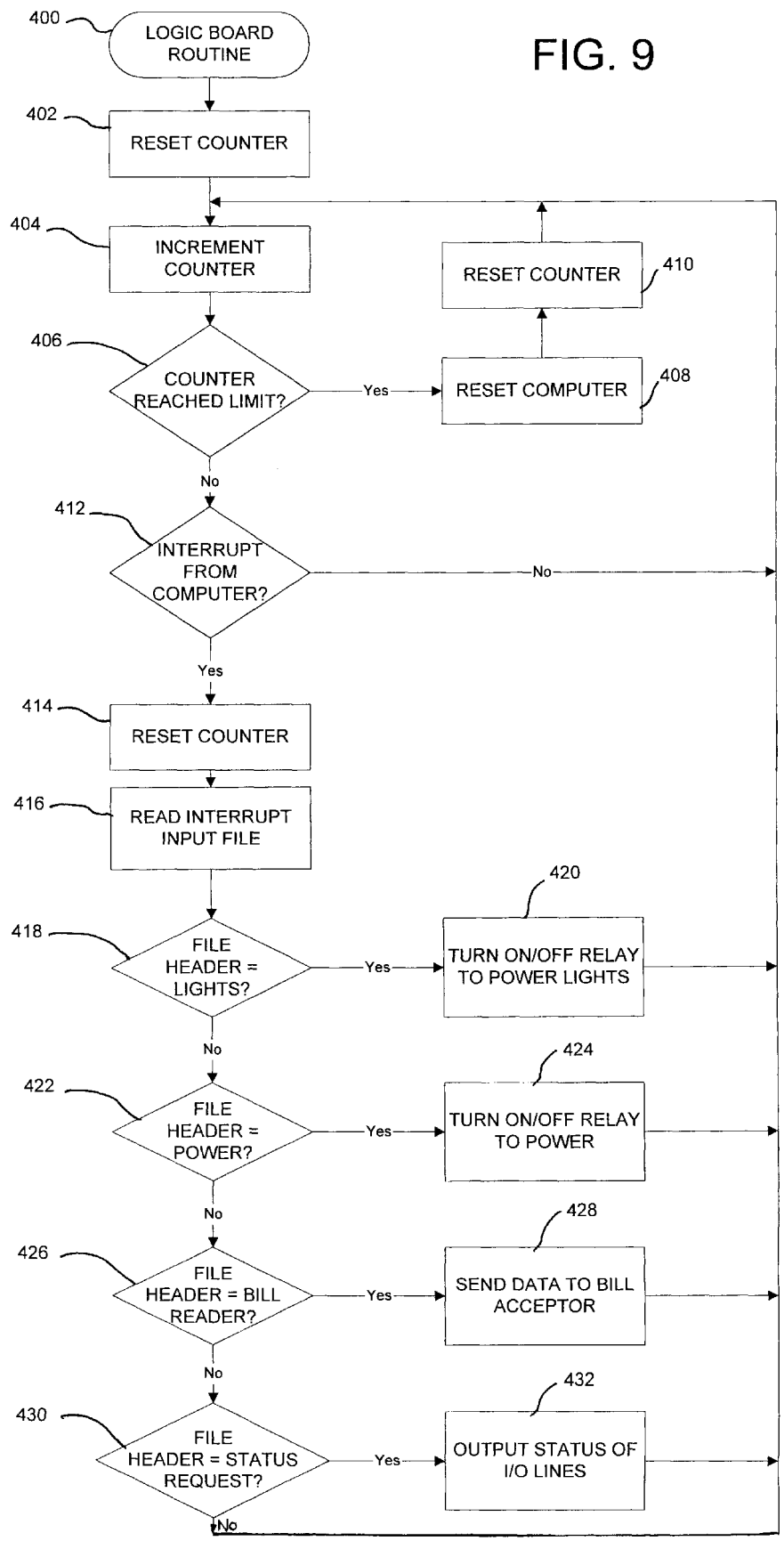
FIG. 9 is a flow diagram illustrating the steps executed by logic board 120 of the image processing system of the present invention.

FIG. 9 is a flow diagram illustrating the routine performed by the logic board 120, which is carried out and executed concurrently with the PBOS and other routines discussed above. Logic board routine 400 begins by first resetting the internal counter 402 which has been described at some length above. The internal counter generally is allowed to count to a predetermined time, such as ten minutes, or any other interval of time at which it would be safe to assume that computer 100 is hung-up. Once the counter is initially reset in step 402, the processor in logic board 120 increments the counter in step 404 prior to advancing to step 406 where the processor determines whether the counter has reached the predefined limit. If the predefined limit has been reached (i.e., a number of counts equalling the ten minute interval), the processor on logic board 120 resets computer 100 via wires physically connected to the mainboard reset connector or other hardware means to reset the computer in step 408. Then, the processor resets the counter in step 410 and returns to step 404 to again increment the counter. Provided the counter has not yet reached its limit, the logic board routine proceeds to step 412 where the processor determines whether it has received an interrupt signal from computer 100. Such interrupt signals may include the reset commands described above with respect to the PBOS routine. If such an interrupt is received, the processor on logic board 120 resets the counter in step 414 and reads the interrupt input file received from computer 100 in step 416. If an interrupt is not detected in step 412, the routine returns to step 404 and the counter is again incremented until either it reaches its limit or an interrupt is received from computer 100. After reading a received interrupt input file in step 416, the processor determines whether the file header is equal to "lights" in step 418. If so, the processor on logic board 120 turns on or off the relay switch to power the lighting system 125 in accordance with the particular command from computer 100. If, in step 422, the processor determines that the file header is equal to "power," computer 100 turns on or off the relay to the power module 190 (step 424) which may result from computer 100 responding to a soft power down instruction in PBOS routine 200. If the processor determines in step 426 that the file header equals "bill reader," the processor sends data to the bill acceptor as indicated in step 428. If the file header equals "status request," the processor advances from step 430 to step 432 in which it outputs the status of the input/output (I/O) lines connected to it to computer 100.

Although a specific implementation of a photobooth and an image processing system employed in such a photobooth has been described above, it will be appreciated by those of ordinary skill in the image processing art that the chroma-key methods described above could be implemented in other environments similar to that of a photobooth and that the above-described chroma-key technique is particularly well-suited to those environments in which there is little control over what type of clothing the foreground subject may be wearing. Further, it will be understood by those of ordinary skill in the art that the above-described chroma-key technique can be made to work with any backdrop color provided the color is a saturated color. Further, it will be understood by those of ordinary skill in the art that the above-described photobooth operating system could be implemented in any photobooth, regardless of the specific picture-type options that it is capable of making available.

Further, although the picture taking routines described above are described as utilizing a countdown sequence, it will be appreciated that other sequences may be used. For example, a video segment of a predetermined length may be stored in memory or on tape and rewound and replayed frame-by-frame in response to user actuation of appropriate touch keys on monitor 70. When a desired frame is located by the user, the user could then press a print key causing the selected image frame to be printed.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

The embodiments of the invention in which an exclusive property or privilege is claimed are defined as follows:

1. A photobooth comprising:

a memory for storing at least one background image;

a backdrop of uniform color disposed on a rear wall of the photobooth behind a location where at least one subject is to be photographed, said backdrop having a saturated color which, when illuminated, reflects primarily only the saturated color;

a low color temperature for illuminating the front of the subject with light having a spectral distribution that causes a shifting of the perceived colors of the subject by decreasing the intensity of any color components reflected from the front of the subject that correspond to the saturated color of said backdrop;

a camera for generating image signals representing a foreground image of the front of the subject and said backdrop; and an image processing device coupled to said camera for receiving the image signals, and coupled to said memory for receiving a background image, said image processing device superimposes corresponding portions of said background image on corresponding portions of said foreground image that have color components corresponding to that of said backdrop that meet predetermined criteria to produce a composite image signal.

2. The photobooth as defined in claim 1 and further including a printer for receiving and printing said composite image, wherein said camera is a video camera that generates live foreground video images of the subject and said backdrop, wherein said image processing device superimposes said background image over portions of the live foreground video images to output a composite video image, and wherein said printer prints a still frame composite image corresponding to a particular frame of the composite video image.

3. The photobooth as defined in claim 2, wherein the image signals generated by said video camera include RGB primary color component video signals.

4. The photobooth as defined in claim 1, wherein the color of said backdrop is a saturated blue and wherein said image processing device replaces portions of said foreground image that have a blue primary color component that corresponds to that of said backdrop with corresponding portions of the background image.

5. The photobooth as defined in claim 1 and further including a color adjustment circuit coupled to said image processing device for receiving said composite image and for adjusting the color of said composite image to compensate for color shifting that results from illuminating the subject with light from said light source.

6. The photobooth as defined in claim 1 and further including a second light source positioned in said photobooth between the subject and said backdrop to illuminate said backdrop with light that further intensifies the color of said backdrop thereby creating further separation of the color components reflected from the subject and said backdrop.

7. The photobooth as defined in claim 1 and further including a display monitor provided in an external wall of the photobooth to display information to people outside of the photobooth.

8. The photobooth as defined in claim 1, wherein said saturated color of said backdrop is a primary color.

9. The photobooth as defined in claim 1, wherein said image processing device is a chroma-key device.

10. The photobooth as defined in claim 9, wherein said chroma-key device is an analog chroma-key device.

11. The photobooth as defined in claim 1 and further including:

a printer for receiving and printing said composite image;

a user input device for generating a take-picture signal in response to an actuation thereof; and a controller coupled to said printer and to said user input device for controlling said printer to print said composite image in response to the take-picture signal received from said user input device.

12. The photobooth as defined in claim 11, wherein said controller is a computer processor.

13. The photobooth as defined in claim 11 and further including a modem coupled to said controller and adapted for coupling to an external communication link for enabling remote access and communication with said controller.

14. The photobooth as defined in claim 13, wherein said memory is coupled to said controller and wherein said controller receives background images from a remote location through said modem and stores the received background images in said memory for selection by users of the photobooth.

15. The photobooth as defined in claim 11 and further including a display monitor coupled to said controller for displaying information to the user.

16. The photobooth as defined in claim 1 and further including a display monitor for receiving and displaying the composite image produced by said image processing device.

17. The photobooth as defined in claim 16, wherein said display monitor is provided inside the photobooth adjacent to said camera to display the composite image to the subject.

18. The photobooth as defined in claim 17 and further including a second display monitor provided in an external wall of the photobooth to display information to people outside of the photobooth.

19. A photobooth comprising:

a memory for storing at least one background image;

a backdrop of uniform color disposed on a rear wall of the photobooth behind a location where at least one subject is to be photographed, said backdrop having a saturated color which, when illuminated, reflects primarily only the saturated color;

a light source for illuminating the subject with light having a spectral distribution that causes a shifting of the perceived colors of the subject by decreasing the intensity of any color components reflected from the front of the subject that correspond to the saturated color of said backdrop;

a camera for generating image signals representing a foreground image of the subject and said backdrop;

an image processing device coupled to said camera for receiving the image signals, and coupled to said memory for receiving a background image, said image processing device superimposes corresponding portions of said background image on corresponding portions of said foreground image that have color components corresponding to that of said backdrop that meet predetermined criteria to produce a composite image signal; and a printer for receiving and printing said composite image, wherein said camera is a video camera that generates live foreground video images of the subject and said backdrop, wherein said image processing device superimposes said background image over portions of the live foreground video images to output a composite video image, and wherein said printer prints a still frame composite image corresponding to a particular frame of the composite video image, wherein said image processing device receives the RGB primary color component video signals from said video camera and compares the intensity of each pixel of one of the RGB primary component color component video signals to an intensity threshold level and replaces any pixel of the foreground image that has an intensity level exceeding the intensity threshold level with a corresponding pixel of the background image.

20. A photobooth comprising:

a memory for storing at least one background image;

a backdrop of uniform color disposed on a rear wall of the photobooth behind a location where at least one subject is to be photographed, said backdrop having a saturated color which, when illuminated, reflects primarily only the saturated color;

a light source for illuminating the subject with light having a spectral distribution that causes a shifting of the perceived colors of the subject by decreasing the intensity of any color components reflected from the subject that correspond to the saturated color of said backdrop;

a camera for generating image signals representing a foreground image of the front of the subject and said backdrop;

an image processing device coupled to said camera for receiving the image signals, and coupled to said memory for receiving a background image, said image processing device superimposes corresponding portions of said background image on corresponding portions of said foreground image that have color components corresponding to that of said backdrop that meet predetermined criteria to produce a composite image signal; and a second light source positioned in said photobooth between the subject and said backdrop to illuminate said backdrop with light that further intensifies the color of said backdrop thereby creating further separation of the color components reflected from the subject and said backdrop, wherein said second light source is a high color temperature light source.

21. A photobooth comprising:

a memory for storing at least one background image;

a backdrop of uniform color disposed on a rear wall of the photobooth behind a location where at least one subject is to be photographed, said backdrop having a saturated color which, when illuminated, reflects primarily only the saturated color;

a light source for illuminating the subject with light having a spectral distribution that color components reflected from the subject that correspond to the saturated color of said backdrop;

a camera for generating image signals representing a foreground image of the subject and said backdrop;

an image processing device coupled to said camera for receiving the image signals, and coupled to said memory for receiving a background image, said image processing device superimposes corresponding portions of said background image on corresponding portions of said foreground image that have color components corresponding to that of said backdrop that meet predetermined criteria to produce a composite image signal;

a printer for receiving and printing said composite image;

a user input device for generating a take-picture signal in response to an actuation thereof; and a controller coupled to said printer and to said user input device for controlling said printer to print said composite image in response to the take-picture signal received from said user input device, wherein said controller initiates a countdown sequence in response to the take-picture signal and controls said printer to print said composite image after the countdown sequence has terminated.

22. The photobooth as defined in claim 21 and further including a display monitor coupled to said controller for displaying countdown information to the user.

23. A photobooth comprising:

a memory for storing at least one background image;

a backdrop of uniform color disposed on a rear wall of the photobooth behind a location where at least one subject is to be photographed, said backdrop having a saturated color which, when illuminated, reflects primarily only the saturated color;

a light source for illuminating the subject with light having a spectral distribution that causes a shifting of the perceived colors of the subject by decreasing the intensity of any color components reflected from the subject that correspond to the saturated color of said backdrop;

a camera for generating image signals representing a foreground image of the front of the subject and said backdrop;

an image processing device coupled to said camera for receiving the image signals, and coupled to said memory for receiving a background image, said image processing device superimposes corresponding portions of said background image on corresponding portions of said foreground image that have color components corresponding to that of said backdrop that meet predetermined criteria to produce a composite image signal;

a printer for receiving and printing said composite image;

a user input device for generating a take-picture signal in response to an actuation thereof;

a controller coupled to said printer and to said user input device for controlling said printer to print said composite image in response to the take-picture signal received from said user input device; and a display monitor coupled to said controller for displaying information to the user, wherein said user input device is a touch screen input device provided on said display monitor, and wherein said controller displays user options to the user on said display monitor and responds to the selection of a user option as provided through said touch screen input device by implementing the selected user option.

24. The photobooth as defined in claim 23, wherein a plurality of different background images are stored in said memory and said controller is coupled to said memory for reading the background images therefrom and for displaying the background images on said display monitor for a user to select one of the displayed background images by actuating said touch screen input device in a region of said display monitor corresponding to the region in which the selected background image is displayed.

25. The photobooth as defined in claim 24, wherein said controller is coupled to said image processing device for supplying said image processing device with the selected background image.

26. A method of producing a composite image of a subject comprising the steps of:

providing a backdrop behind the subject, said backdrop having a uniform saturated color which, when illuminated, reflects primarily only the saturated color;

illuminating the front of the subject with a low color temperature light having a spectral distribution that causes a shifting of the perceived colors of the subject by decreasing the intensity of any color components reflected from the front of the subject that correspond to the saturated color of said backdrop;

filming the subject and said backdrop using a camera capable of generating electric signals representing a foreground image of the front of the subject and said backdrop; and superimposing a previously-stored background image over those portions of said foreground image having color components corresponding to that of said backdrop that meet predetermined criteria to produce a composite image.

27. The method as defined in claim 26 and further including the step of printing said composite image.

28. The method as defined in claim 26 and further including the step of illuminating said backdrop with light having a spectral distribution that intensifies the reflected saturated color of said backdrop.

29. The method as defined in claim 26, wherein said composite image is a continuous video image.

30. The method as defined in claim 26, wherein said composite image is a still photograph.

31. The method as defined in claim 26, wherein the step of filming the subject includes using a video camera to film the subject and said backdrop.

32. The method as defined in claim 31, wherein said video camera generates electrical signals representing RGB color components of said foreground image.

33. The method as defined in claim 26 and further including the step of shifting the colors in said composite image by increasing the intensity of any color component in said composite image that corresponds to the color of said backdrop to produce a color-corrected composite image.

34. The method as defined in claim 33 and further including the step of printing said color-corrected composite image.

35. The method as defined in claim 26, wherein the step of superimposing a previously-stored background image over portions of said foreground image to produce a composite image is performed by a chroma-key device.

36. The method as defined in claim 35, wherein said chroma-key device is an analog chroma-key device.

37. A method of producing a composite image of a subject comprising the steps of:

providing a backdrop behind the subject, said backdrop having a uniform saturated color having a primary color component which, when illuminated, reflects primarily only the saturated color and has a reflected intensity exceeding a threshold intensity level;

illuminating the subject with light having a spectral distribution that causes a shifting of the perceived colors of the subject by decreasing the intensity of any color components reflected from the subject that correspond to the saturated color of said backdrop, wherein the light is a low color temperature light to lower the intensity of any blue color components of the light reflected from the subject with a light source deficient in the primary color so as to lower the intensity of any of the primary color component of the light reflected from the subject;

filming the subject and said backdrop using a camera capable of generating electric signals representing a foreground image of the subject and said backdrop; and superimposing a previously-stored background image over those portions of said foreground image having color components corresponding to that of said backdrop that meet predetermined criteria to produce a composite image.

38. The method as defined in claim 37, wherein the primary color is blue.

39. A method of producing a photograph of a subject comprising the steps of:

providing a backdrop behind the subject, said backdrop having a uniform saturated blue color having a blue primary color component which, when illuminated, has a reflected intensity exceeding a threshold intensity level established for the blue primary color component;

illuminating the front of the subject with low color temperature light to decrease the intensity of any blue primary color components in light reflected from the front of the subject relative to said threshold intensity level;

filming the subject and said backdrop using a camera capable of generating electric signals representing a foreground image of the front of the subject and said backdrop; and superimposing a previously-stored background image over those portions of said foreground image having a blue primary color component that is above said threshold intensity level to produce a composite image.

40. The method as defined in claim 39 and further including the step of printing said composite image.

41. The method as defined in claim 39, wherein the step of superimposing a previously-stored background image over portions of said foreground image to produce a composite image is performed by a chroma-key device.

42. The method as defined in claim 39, wherein the step of filming the subject includes using a video camera to film the subject and said backdrop.

43. The method as defined in claim 42, wherein said video camera generates electrical signals representing RGB color components of said foreground image.

44. The method as defined in claim 39 and further including the step of shifting the colors in said composite image by increasing the intensity of any blue color component in said composite image to produce a color-corrected composite image.

45. The method as defined in claim 44 and further including the step of printing said color-corrected composite image.

46. A method of producing a photograph of a subject comprising the steps of:

providing a backdrop behind the subject, said backdrop having a uniform saturated blue color having a blue primary color component which, when illuminated, has a reflected intensity exceeding a threshold intensity level established for the blue primary color component;

illuminating the subject with low color temperature light to decrease the intensity of any blue primary color components in light reflected from the subject relative to said threshold intensity level;

illuminating said backdrop with high temperature light to increase the intensity of the blue primary color component of said backdrop to increase relative to said threshold intensity level;

filming the subject and said backdrop using a camera capable of generating electric signals representing a foreground image of the subject and said backdrop; and superimposing a previously-stored background image over those portions of said foreground image having a blue primary color component that is above said threshold intensity level to produce a composite image.

47. A photobooth comprising:

user input means for generating a take-picture signal in response to an actuation thereof;

a camera for generating an image of a subject;

a printer for printing said image of the subject;

a controller coupled to said printer and to said user input device for controlling said printer to print said image in response to the take-picture signal received from said user input means; and a processor coupled to said controller for monitoring signals generated by said controller to determine whether said controller is malfunctioning, when said processor determines that said controller is malfunctioning, said processor resets said controller.

48. The photobooth as defined in claim 47, wherein said processor includes a timer that measures a period of time since a last signal was output from said controller, said processor resets said controller when the measured period of time exceeds a predetermined threshold.

49. The photobooth as defined in claim 47, wherein said controller periodically supplies reset signals to said processor when operating properly, and wherein said processor includes a timer that measures a period of time since the last reset signal was received from said controller, said processor resets said controller when the measured period of time exceeds a predetermined threshold.

50. In a photobooth having a computer processor for controlling other components of the photobooth in accordance with one or more control programs, a method of preventing said computer processor from becoming hung-up comprising the steps of:

providing instructions in any control program that the computer processor executes that cause said computer processor to periodically generate reset signals within time intervals not exceeding a predetermined duration;

providing monitoring means, separate from and coupled to said computer processor, for measuring a period of time since a last reset signal was received from the computer processor;

resetting said computer processor when said monitoring means determines that the measured period of time exceeds the predetermined duration.

51. A computer-executable operating system for a controller of a photobooth having image processing equipment coupled to the controller for generating and processing an image of at least one subject inside the photobooth, the photobooth further including a service switch, a memory device, a display monitor, and a user input device for receiving user input selections, all coupled to said controller, said operating system comprising:

service switch detection means for detecting an actuation of the service switch;

mode changing means for changing a mode of controller operation between an operating mode and a service mode in response to an actuation of the service switch;

operating means operable during an operating mode for instructing said controller to display a user option screen showing user selectable options on the display monitor including picture-type options that relate to a type of picture that is desired by the user, receive user input from the user input device and identify which of the displayed options the user has selected, and execute one of a plurality of program routines stored in the memory device corresponding to a picture type selected by the user, wherein said program routines cause said controller to control the image processing equipment in a manner required to produce the selected picture type, and wherein said program routines return execution control of the controller to the operating system; and service means operable during a service mode for instructing said controller to display operator selectable options on the display device including an option for enabling a new user selectable picture-type option to the user option screen, display any user selectable picture types stored in the memory device that are disabled in response to an operator selection of the option for enabling a new picture-type option, to enable the operator to select the picture-type option to be enabled, reconfigure the user option screen to include the operator-selected new picture type as a user selectable option, and create a program call to the program routine stored in the memory device that corresponds to the new picture-type option to be added to the user option screen, the newly created program call causes the controller to execute the corresponding program routine in response to a user selection of the new picture type when the controller is in the operating mode.

52. A computer-executable operating system for a controller of a photobooth having image processing equipment coupled to the controller for generating and processing an image of at least one subject inside the photobooth, the photobooth further including a service switch, a memory device, a display monitor, a user input device for receiving user input selections, and a data input device, all coupled to said controller, said operating system comprising:

service switch detection means for detecting an actuation of the service switch;

mode changing means for changing a mode of controller operation between an operating mode and a service mode in response to an actuation of the service switch;

operating means operable during an operating mode for instructing said controller to display a user option screen showing user selectable options on the display monitor including picture-type options that relate to a type of picture that is desired by the user, receive user input from the user input device and identify which of the displayed options the user has selected, and execute one of a plurality of program routines stored in the memory device corresponding to a picture type selected by the user, wherein said program routines cause said controller to control the image processing equipment in a manner required to produce the selected picture type, and wherein said program routines return execution control of the controller to the operating system; and service means operable during a service mode for instructing said controller to
display operator selectable options on the display device including an option for adding a new picture-type option,
read a new program routine corresponding to the new picture-type option from the data input device in response to an operator selection of the option for adding a new picture-type option,
store the new program routine in the memory device, and
reconfigure an operator option screen to include the new picture type as a picture-type option that may be enabled.

53. The operating system as defined in claim 52, wherein, during the service mode, said service means further instructs the controller to
display operator selectable options on the display device including an option for enabling a new user selectable picture-type option to the user option screen,
display any user selectable picture types stored in the memory device that are disabled in response to an operator selection of the option for enabling a new picture-type option, to enable the operator to select the picture-type option to be enabled,
reconfigure the user option screen to include the operator-selected new picture type as a user selectable option, and
create a program call to the program routine stored in the memory device that corresponds to the new picture-type option to be added to the user option screen, the newly created program call causes the controller to execute the corresponding program routine in response to a user selection of the new picture type when the controller is in the operating mode.

54. A computer-executable operating system for a controller of a photobooth having image processing equipment coupled to the controller for generating and processing an image of at least one subject inside the photobooth, the photobooth further including a service switch, a memory device, a display monitor, and a user input device for receiving user input selections, said operating system comprising:
service switch detection means for detecting an actuation of the service switch;
mode changing means for changing a mode of controller operation between an operating mode and a service mode in response to an actuation of the service switch;
means operable during an operating mode for instructing said controller to
display a user option screen showing user selectable options on the display monitor including picture-type options that relate to a type of picture that is desired by the user,
receive user input from the user input device and identify which of the displayed options the user has selected, and
execute one of a plurality of program routines stored in the memory device corresponding to a picture type selected by the user, wherein said program routines cause said controller to control the image processing equipment in a manner required to produce the selected picture type, and wherein said program routines return execution control of the controller to the operating system; and
means operable during a service mode for instructing said controller to
display operator selectable options on the display device including an option for removing one of the existing user selectable picture-type options,
display the picture-type options on the display device in response to an operator selection of the option for removing a picture-type option, to enable the operator to select the picture-type option to be removed,
delete from the memory device, the program routine corresponding to the picture-type option selected by the operator for deletion,
reconfigure the user option screen to remove any reference to the picture-type option to be removed as a user selectable option, and
delete any program calls to the deleted program routine that would attempt to cause the controller to execute the deleted program routine when the controller is in the operating mode.

55. A computer-executable operating system for a controller of a photobooth having image processing equipment coupled to the controller for generating and processing an image of at least one subject inside the photobooth, the photobooth further including a service switch, a memory device, a display monitor, and a user input device for receiving user input selections, said operating system comprising:
service switch detection means for detecting an actuation of the service switch;
mode changing means for changing a mode of controller operation between an operating mode and a service mode in response to an actuation of the service switch;
means operable during an operating mode for instructing said controller to
display a user option screen showing user selectable options on the display monitor including picture-type options that relate to a type of picture that is desired by the user,
receive user input from the user input device and identify which of the displayed options the user has selected, and
execute one of a plurality of program routines stored in the memory device corresponding to a picture type selected by the user, wherein said program routines cause said controller to control the image processing equipment in a manner required to produce the selected picture type, and wherein said program routines return execution control of the controller to the operating system; and
means operable during a service mode for instructing said controller to
display operator selectable options on the display device including an option for disabling one of the existing user selectable picture-type options,
display the picture-type options on the display device that are currently enabled in response to an operator selection of the option for removing a picture-type option, to allow the operator to select the picture-type option to be disabled,
reconfigure the user option screen to remove any reference to the picture-type option to be disabled as a user selectable option, and
delete any program calls to the program routine stored in the memory device that corresponds to the disabled picture-type option and that would cause the controller to execute the program routine when the controller is in the operating mode.

56. A computer-executable operating system for a controller of a photobooth having image processing equipment coupled to the controller for generating and processing an image of at least one subject inside the photobooth, the photobooth further including a service switch, a memory device, a display monitor, a user input device for receiving user input selections, and a data input device, all coupled to said controller, said operating system comprising:

service switch detection means for detecting an actuation of the service switch;

mode changing means for changing a mode of controller operation between an operating mode and a service mode in response to an actuation of the service switch;

means operable during an operating mode for instructing said controller to display a user option screen showing user selectable options on the display monitor including a plurality of images that are stored in the memory device and that may be selected by the user for use by the image processing equipment, receive user input from the user input device and identify which of the displayed images the user has selected, and supply the selected image to the image processing equipment; and means operable during a service mode for instructing said controller to display operator selectable options on the display device including an option for adding a new user selectable image, read an image file corresponding to the new user selectable image from the data input device in response to an operator selection of the option for adding a new image, store the image file in the memory device, reconfigure the user option screen to include the new image as a user selectable option, and create a program call to the new image file stored in the memory device that will cause the controller to supply the new image to the image processing equipment in response to a user selection of the new image when the controller is in the operating mode.

57. The operating system as defined in claim 56, wherein said data input device is a modem.

58. The operating system as defined in claim 56, wherein said data input device is a data reading device for reading data from a portable data storage medium.

59. A photobooth comprising:

a memory for storing at least one background image;

a backdrop of uniform color disposed on a rear wall of the photobooth behind a location where at least one subject is to be photographed, said backdrop having a saturated color which, when illuminated, reflects primarily only the saturated color;

a high color temperature light source positioned in said photobooth between the subject and said backdrop to illuminate said backdrop with light that further intensifies the color of said backdrop thereby creating further separation of the color components reflected from the subject and said backdrop;

a camera for generating image signals representing a foreground image of the subject and said backdrop; and an image processing device coupled to said camera for receiving the image signals, and coupled to said memory for receiving a background image, said image processing device superimposes corresponding portions of said background image on corresponding portions of said foreground image that have color components corresponding to that of said backdrop that meet predetermined criteria to produce a composite image signal.

60. The photobooth as defined in claim 59 and further including:

a light source for illuminating the subject with light having a spectral distribution that causes a shifting of the perceived colors of the subject by decreasing the intensity of any color components reflected from the subject that correspond to the saturated color of said backdrop; and a printer for receiving and printing said composite image.

61. A photobooth comprising:

a camera for generating image signals representing a foreground image of the subject;

an image processing device coupled to said camera for receiving and processing the image signals;

a controller coupled to said image processing device for controlling said image processing device to output a processed image;

a modem coupled to said controller and adapted for coupling to an external communication link for enabling remote access and communication with said controller;

a memory coupled to said controller for storing at least one background image;

a backdrop of uniform color disposed on a rear wall of the photobooth behind a location where at least one subject is to be photographed, said backdrop having a saturated color which, when illuminated, reflects primarily only the saturated color; and a light source for illuminating the subject with light having a spectral distribution that causes a shifting of the perceived colors of the subject by decreasing the intensity of any color components reflected from the subject that correspond to the saturated color of said backdrop, wherein said image processing device is coupled to said memory for receiving a background image, said image processing device superimposes corresponding portions of said background image on corresponding portions of said foreground image that have color components corresponding to that of said backdrop that meet predetermined criteria to produce a composite image signal.

62. The photobooth as defined in claim 61, wherein said controller receives background images from a remote location through said modem and stores the received background images in said memory for selection by users of the photobooth.

63. The photobooth as defined in claim 61 and further including:

a printer for receiving and printing said processed image; and a user input device for generating a take-picture signal in response to an actuation thereof, wherein said controller is coupled to said printer and to said user input device for controlling said printer to print said processed image in response to the take-picture signal received from said user input device.

64. A computer-executable operating system for a controller of a photobooth having image processing equipment coupled to the controller for generating and processing an image of at least one subject inside the photobooth, the photobooth further including a service switch, a memory device, a display monitor, and a user input device for receiving user input selections, all coupled to said controller, said operating system for instructing said controller to:

display a user option screen showing user selectable options on the display monitor including picture-type options that relate to a type of picture that is desired by the user;

receive user input from the user input device and identify which of the displayed options the user has selected; and execute one of a plurality of program routines stored in the memory device corresponding to a picture type selected by the user, wherein said program routines cause said controller to control the image processing equipment in a manner required to produce the selected picture type, and wherein said program routines return execution control of the controller to the operating system.

* * * * *